US012156046B2

(12) United States Patent
Ramachandra et al.

(10) Patent No.: US 12,156,046 B2
(45) Date of Patent: Nov. 26, 2024

(54) MINIMIZATION OF DRIVE TEST CONFIGURATION DETAILS IN NEW RADIO

(71) Applicant: Telefonaktiebolaget LM Ericsson (PUBL), Stockholm (SE)

(72) Inventors: Pradeepa Ramachandra, Linköping (SE); Wei Shen, Linköping (SE); Malik Wahaj Arshad, Stockholm (SE); Fredrik Gunnarsson, Linköping (SE)

(73) Assignee: TELEFONAKTIEBOLAGET LM ERICSSON (PUBL), Stockholm (SE)

( * ) Notice: Subject to any disclaimer, the term of this patent is extended or adjusted under 35 U.S.C. 154(b) by 416 days.

(21) Appl. No.: 17/598,256

(22) PCT Filed: Mar. 27, 2020

(86) PCT No.: PCT/SE2020/050317
§ 371 (c)(1),
(2) Date: Sep. 25, 2021

(87) PCT Pub. No.: WO2020/197484
PCT Pub. Date: Oct. 1, 2020

(65) Prior Publication Data
US 2022/0182850 A1 Jun. 9, 2022

Related U.S. Application Data

(60) Provisional application No. 62/825,640, filed on Mar. 28, 2019.

(51) Int. Cl.
*H04W 24/02* (2009.01)
*H04W 16/28* (2009.01)
*H04W 24/10* (2009.01)

(52) U.S. Cl.
CPC ........... *H04W 24/02* (2013.01); *H04W 16/28* (2013.01); *H04W 24/10* (2013.01)

(58) Field of Classification Search
CPC ..... H04W 16/28; H04W 24/02; H04W 16/18; H04W 24/10; H04W 64/006; H04M 1/72457
See application file for complete search history.

(56) References Cited

U.S. PATENT DOCUMENTS

2012/0309404 A1* 12/2012 Suzuki ............. H04W 56/0045
455/450
2014/0128057 A1* 5/2014 Siomina ................ H04W 56/00
455/423

(Continued)

FOREIGN PATENT DOCUMENTS

RU   2015 140 957 A   2/2011
WO   2017 138869 A1   8/2017
WO   2019 030730 A1   2/2019
WO   2019 050467 A1   3/2019

OTHER PUBLICATIONS

3GPP TR 36.805 v9.0.0; 3rd Generation Partnership Project; Technical Specification Group Radio Access Network; Study on Minimization of drive-tests in Next Generation Networks; (Release 9)—Dec. 2009.

(Continued)

*Primary Examiner* — Awet Haile
(74) *Attorney, Agent, or Firm* — Baker Botts L.L.P.

(57) ABSTRACT

A method performed by a wireless device for configured Minimization of Drive Test, MDT, reporting includes obtaining a MDT configuration. The obtained MDT configuration is for one or more of immediate MDT and logged MDT. The MDT configuration is for performing one or more measurements associated with a specific reference signal type, beam level, or positioning assistance data, and the obtained MDT configuration comprising one or more of: a reportOnLeaveconfiguration; a reportQuantityRS-Indexes configuration; a maxNrofRS-IndexesToReport configuration: and an rsType configuration. The wireless device (Continued)

performs the one or more measurements according to the MDT configuration and provides an MDT report based on the one or more measurements.

18 Claims, 18 Drawing Sheets

(56) References Cited

U.S. PATENT DOCUMENTS

| | | | |
|---|---|---|---|
| 2015/0024775 A1 | 1/2015 | Jung et al. | |
| 2015/0223193 A1* | 8/2015 | Chang | H04M 1/72457 |
| | | | 455/566 |
| 2020/0383080 A1* | 12/2020 | Sharma | H04W 76/10 |
| 2022/0104050 A1* | 3/2022 | Liu | H04W 24/10 |
| 2022/0124531 A1* | 4/2022 | Miao | H04B 17/345 |

OTHER PUBLICATIONS

3GPP TS 32.422 v15.1.0; Technical Specification; 3rd Generation Partnership Project; Technical Specification Group Services and System Aspects; Telecommunication management; Subscriber and equipment trace; Trace control and configuration management (Release 15)—Jun. 2018.

3GPP TSG-RAN WG2 Meeting #78; Prague, Czech Republic; Source: Nokia Siemens Networks, Nokia Corporation; Title: Evaluation of A2 trigger for Immediate MDT (R2-122155)—May 21-25, 2012.

3GPP TSG-RAN WG2 Meeting #105; Athens, Greece; Source: ZTE Corporation, Sanechips; Title: Signalling procedure and measurement quantities for NR MDT (R2-1900670)—Feb. 25 - Mar. 1, 2019.

PCT International Search Report issued for International application No. PCT/SE2020/050317—May 13, 2020.

PCT Written Opinion of the International Searching Authority issued for International application No. PCT/SE2020/050317—May 13, 2020.

EPO Communication issued for Application No. 20 717 339.4-1216—May 4, 2023.

Search Report issued by the Federal Institute of Industrial Property of the Russian Federation for Application No. 2021131412—May 11, 2022.

\* cited by examiner

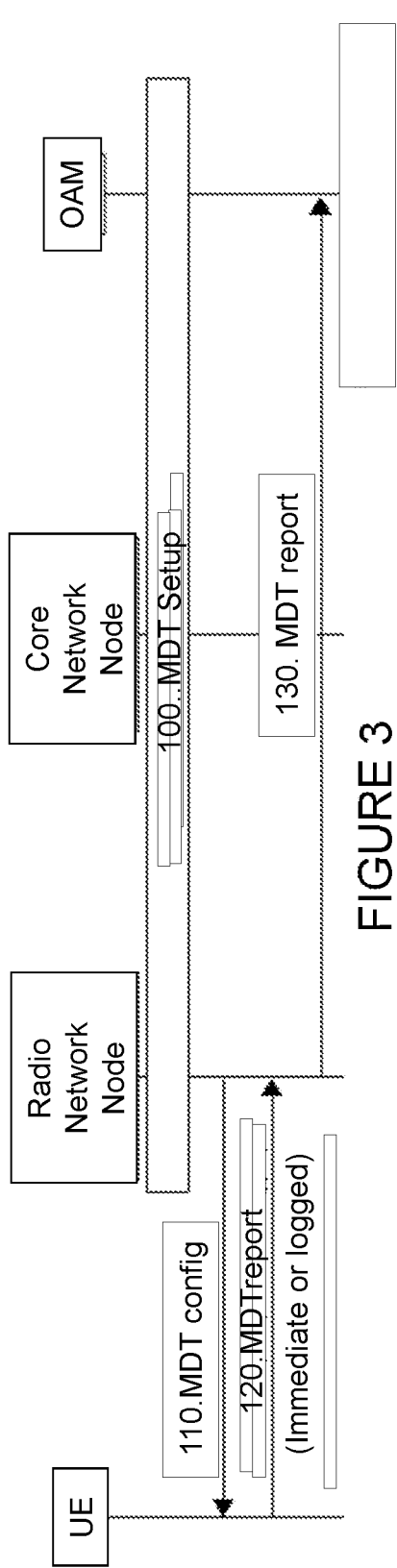
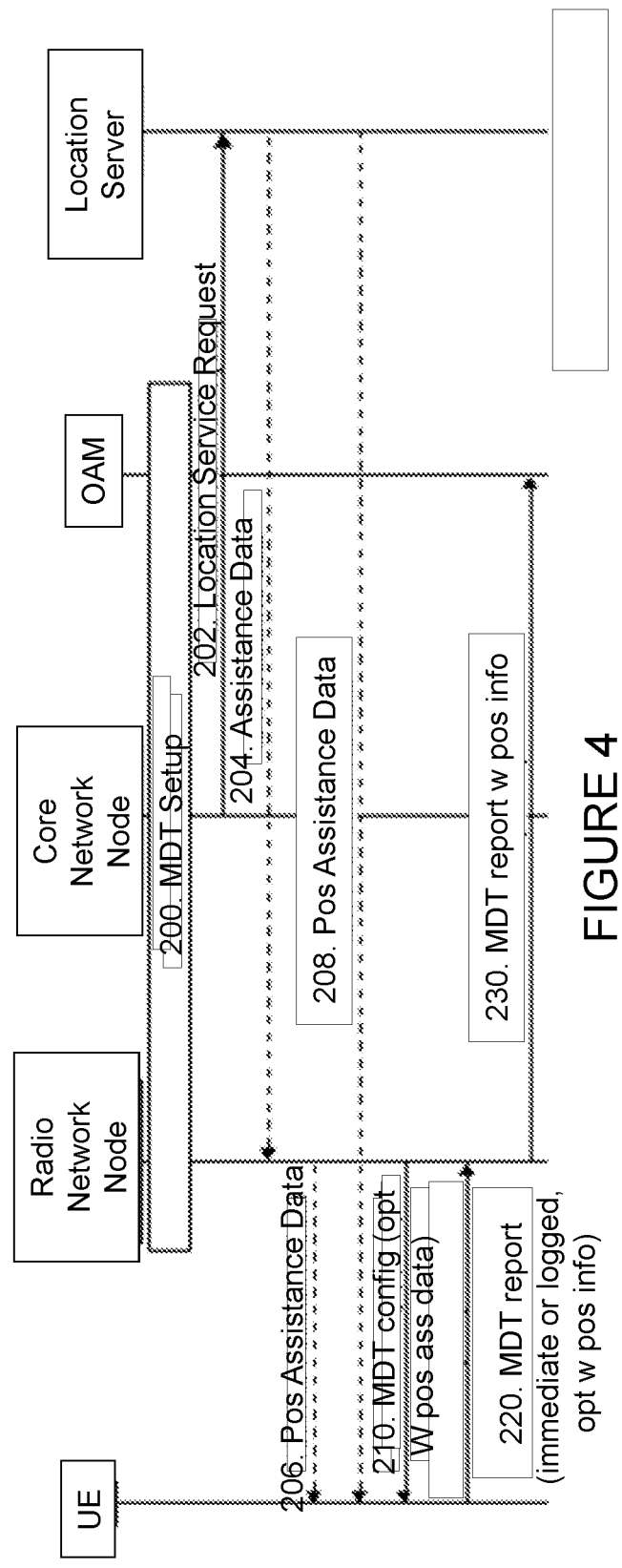
FIGURE 3
FIGURE 4

MINIMIZATION OF DRIVE TEST CONFIGURATION DETAILS IN NEW RADIO

PRIORITY

This nonprovisional application is a U.S. National Stage Filing under 35 U.S.C. § 371 of International Patent Application Serial No. PCT/SE2020/050317 filed Mar. 27, 2020 and entitled "Minimization of Drive Test Configuration Details in New Radio" which claims priority to U.S. Provisional Patent Application No. 62/825,640 filed Mar. 28, 2019 both of which are hereby incorporated by reference in their entirety.

TECHNICAL FIELD

The present disclosure relates, in general, to wireless communications and, more particularly, systems and methods for Minimization of Drive Test (MDT) configuration details in New Radio (NR).

BACKGROUND

Minimization of Drive Test (MDT) was first studied in Release 9 (3rd Generation Partnership Project (3GPP) TR 36.805) driven by RAN2 with the purpose to minimize the actual drive tests. MDT has been introduced since Release 10 in Long Term Evolution (LTE). MDT has not been specified for New Radio (NR) in the involved standards in RAN2, RAN3 and SA5 groups. The use cases in 3GPP TR 36.805 include: coverage optimization; mobility optimization; capacity optimization; parameterization for common channels; and Quality of Service (QoS) verification.

Normal Radio Resource Management (RRM) mechanisms only allow for measurements to be reported when the user equipment (UE) has Radio Resource Control (RRC) connection with a particular cell and there is sufficient uplink (UL) coverage to transport the MEASUREMENT REPORT. This will restrict measurements to be collected from UEs not experiencing radio link failure (RLF) and experiencing sufficient uplink (UL) coverage. Besides, there is no accompanying location information in normal RRM measurements.

In general, there are two types of MDT measurement logging: Logged MDT and Immediate MDT. For logged MDT, a UE in RRC_IDLE state is configured to perform periodical MDT logging after receiving the MDT configurations from the network. The UE shall report the downlink (DL) pilot strength measurements (e.g., Reference Signal Received Power (RSRP)/Reference Signal Received Quality (RSRQ)) together with time information, detailed location information if available, and Wide Local Area Network (WLAN), Bluetooth to the network via using the UE information framework when it is in RRC_CONNECTED state. The downlink (DL) pilot strength measurement of Logged MDT is collected based on the existing measurements required for cell reselection purpose, without imposing on the UE to perform additional measurements. Table 1 below describes MDT mode, Radio Resource Control (RRC) states, and measurement quantifies for the measurement logging for Logged MDT.

TABLE 1

| MDT mode | RRC states | Measurement quantities |
|---|---|---|
| Logged MDT | RRC_IDLE | RSRP and RSRQ of the serving cell and available UE measurements for intra-frequency/inter-frequency/inter-RAT, time stamp and detailed location information if available. |

FIG. 1 illustrates an example of MDT logging. For Logged MDT, the UE receives the MDT configurations, including logginginterval and loggingduration, in the RRC message (e.g., LoggedMeasurementConfiguration) from the network. A timer (e.g., timer T330) is started at the UE upon receiving the configurations and set to loggingduration (e.g., 10 min-120 min). The UE performs periodical MDT logging with the interval set to logginginterval (e.g., 1.28 s-61.44 s) when the UE is in RRC_IDLE.

Measurements for Immediate MDT purpose can be performed by the Radio Access Network (RAN) and UE. There are a number of measurements (e.g., M1-M9) which are specified for RAN measurements and UE measurements. For UE measurements, the MDT configuration is based on the existing RRC measurement procedures for configuration and reporting with some extensions for location information. The measurement quantities for Immediate MDT are shown Table 2 below.

TABLE 2

| MDT mode | RRC states | Measurement quantities |
|---|---|---|
| Immediate MDT | RRC_CONNECTED | M1: RSRP and RSRQ measurement by UE. M2: Power Headroom measurement by UE. M3: Received Interference Power measurement by eNodeB (eNB). M4: Data Volume measurement separately for DL and UL, per QCI per UE, by eNB. M5: Scheduled IP Throughput for MDT measurement separately for DL and UL, per RAB per UE and per UE for the DL, per UE for the UL, by eNB. M6: Packet Delay measurement, separately for DL and UL, per QCI per UE, see UL PDCP Delay, by the UE, and Packet Delay in the DL per QCI, by the eNB. M7: Packet Loss rate measurement, separately for DL and UL per QCI per UE, by the eNB. M8: Received Signal Strength Indicator (RSSI) measurement by UE. M9: Return Trip Time (RTT) measurement by UE. |

The reporting of the Immediate MDT is specified as follows.
For M1:
  Event-triggered measurement reports according to existing RRM configuration for events A1, A2, A3, A4, A5 A6, B1 or B2.
  Periodic, A2 event-triggered, or A2 event triggered periodic measurement report according to MDT specific measurement configuration.
For M2: Reception of Power Headroom Report (PHR) according to existing RRM configuration.
For M3-M9: End of measurement collection period.

Furthermore, Logged Multimedia Broadcast Single Frequency Network (MBSFN) MDT is defined to perform measurement logging when a UE is in RRC_IDLE and RRC_CONNECTED. An enhancement on RLF is also specified for RLF report with detailed location information (e.g., Global Navigation Satellite System (GNSS)) if available. RLF reports may also include available WLAN measurement results and/or Bluetooth measurement results for calculating UE location. The measurement quantities for Logged MBSFN MDT and RLF Enhancement are shown in Table 3 below.

TABLE 3

| MDT mode | RRC states | Measurement quantities |
| --- | --- | --- |
| Logged MBSFN MDT | RRC_IDLE, RRC CONNECTED | RSRP, RSRQ, MBSFN RSRP, MBSFN RSRQ, BLER for signalling and BLER for data per MCH |
| RLF Enhancement | RRC_CONNECTED | RLF report with detailed location information (e.g., GNSS); RLF reports may also include available WLAN measurement results and/or Bluetooth measurement results for calculating UE location. |

When MDT was introduced in Release 10, it was decided to include MDT as a part of the Trace function, which is able to provide very detailed logging data at call level. Based on the methods of activating/deactivating trace and trace configuration, the trace function can be classified into the following two aspects.

Management activation/deactivation: Trace Session is activated/deactivated in different Network Elements (NE) directly from the Element Manager (EM) using the management interfaces of those NEs.

Signalling Based Activation/Deactivation: Trace Session is activated/deactivated in different NEs using the signalling interfaces between those elements so that the NEs may forward the activation/deactivation originating from the EM.

On the other hand, the MDT can be classified as Area-based MDT and Signalling-based MDT from the use case perspective illustrated below.

Area-based MDT: MDT data is collected from UEs in a specified area. The area is defined as a list of cells (e.g., Universal Terrestrial Radio Access Network (UTRAN) or Evolved-UTRAN (E-UTRAN)) or as a list of tracking/routing/location areas. The area-based MDT is an enhancement of the management-based trace functionality. Area-based MDT can be either a logged MDT or Immediate MDT.

Signalling-based MDT: MDT data is collected from one specific UE. The UE that is participating in the MDT data collection is specified as IMEI(SV) or as IMSI. The signalling-based MDT is an enhancement of the signalling-based subscriber and equipment trace. The signalling-based MDT can be either a logged MDT or Immediate MDT.

In LTE, for area-based MDT, the MDT control and configuration parameters are sent by the Network Management directly to the eNodeB (eNB). Then, the eNB selects UEs which fulfil the criteria, including the area scope and the user consent, and starts the MDT. For signaling-based MDT (i.e., UE-specific MDT), the MDT control and configuration parameters are sent by the Network Management to a Mobility Management Entity (MME), which then forwards the parameters to the eNB associated with the specific UE.

FIG. 2 illustrates the classifications of MDT.

Location Information

The Logged MDT measurements are tagged by the UE with location data in the following manner. The E-UTRAN Cell Global Identifier (ECGI) or Cell-Id of the serving cell when the measurement was taken is always included. Detailed location information (e.g., GNSS location information) is included if available in the UE when the measurement was taken. If detailed location information is available, the reporting shall consist of latitude and longitude. Depending on availability, altitude, uncertainty and confidence may be also additionally included. UE tags available detailed location information only once with upcoming measurement sample, and then the detailed location information is discarded (i.e., the validity of detailed location information is implicitly assumed to be one logging interval).

For Immediate MDT, the M1 measurements are tagged by the UE with location data in the following manner. Detailed location information (e.g., GNSS location information) is included if available in the UE when the measurement was taken. If detailed location information is available, the reporting shall consist of latitude and longitude. Depending on availability, altitude, uncertainty and confidence may be also additionally included. The UE should include the available detailed location information only once. If the detailed location information is obtained by GNSS positioning method, GNSS time information shall be included. For both event-based and periodic reporting, the detailed location information is included if the report is transmitted within the validity time after the detailed location information was obtained. The validity evaluation of detailed location information is left to UE implementation.

User Consent Handling

For signalling-based MDT, the Core Network (CN) shall not initiate MDT towards a particular user unless the user consent is available.

For area-based MDT, the CN indicates to the RAN whether MDT is allowed to be configured by the RAN for this user considering, for example, user consent and roaming status, by providing management-based MDT allowed information consisting of the Management Based MDT Allowed indication and optionally the Management Based MDT Public Land Mobile Network (PLMN) List. The management-based MDT allowed information propagates during inter-PLMN handover if the Management Based MDT PLMN List is available and includes the target PLMN.

The same user consent information can be used for area-based MDT and for signaling-based MDT (i.e., there is no need to differentiate the user consent per MDT type). Collecting the user consent shall be done via customer care process. The user consent information availability shall be considered as part of the subscription data and as such this shall be provisioned to the Home Subscriber Server (HSS) database.

Event A2 in NR vs LTE

Event A2 in LTE provides an event triggered reporting when the serving cell quality becomes worse than a threshold. This is described in more detail below:

5.5.4.3 Event A2 (Serving Becomes Worse than Threshold)

The UE shall:

1> consider the entering condition for this event to be satisfied when condition A2-1, as specified below, is fulfilled;

1> consider the leaving condition for this event to be satisfied when condition A2-2, as specified below, is fulfilled;

1> for this measurement, consider the serving cell indicated by the measObjectNR associated to this event.

Inequality A2-1 (Entering condition)

Ms+Hys<Thresh

Inequality A2-2 (Leaving condition)

Ms−Hys>Thresh

The variables in the formula are defined as follows:

Ms is the measurement result of the serving cell, not taking into account any offsets.

Hys is the hysteresis parameter for this event (i.e. hysteresis as defined within reportConfigNR for this event).

Thresh is the threshold parameter for this event (i.e. a2-Threshold as defined within reportConfigNR for this event).

Ms is expressed in dBm in case of RSRP, or in dB in case of RSRQ and RS-SINR.

Hys is expressed in dB.

Thresh is expressed in the same unit as Ms.

LTE's event A2 is taken as the baseline for NR event A2 but some additional enhancements are included as part of the A2 event configuration. First, in NR it is possible to configure reportOnLeave for event A2, whereas in LTE it is not. Second, in NR two different reference signal (RS) types can be used for A2 event configuration (i.e., it is possible to configure either Synchronization Signal Block (SSB) based A2 events or Channel State Information (CSI-RS) based A2 events), whereas in LTE, only Cell-Specific Reference Signals (CRS) based A2 events can be configured. Third, in NR it is possible to configure the UE to include beam level measurements (either beam index only or one or more of beam level RSRP, beam level RSRQ and beam level signal-to-interference-plus-noise ratio (SINR))

There currently exist certain challenges. For area-based MDT defined in the 3$^{rd}$ Generation Partnership Project (3GPP) specification (3GPP TS 32.422), the MDT configuration parameters are always generated by the Element Manager (EM) and sent to the RAN node to execute via a trace session activation request. The MDT parameters for control and configurations can be classified as control and report associated parameters and measurement logging associated parameters. The control and report associated parameters include:

Job type;

Area scope where the UE measurements should be collected (e.g., list of E-UTRAN cells). Tracking Area should be converted to E-UTRAN;

Trace Reference;

IP address of Trace Collection Entity (TCE);

Anonymization of MDT data; and

MDT PLMN List.

The measurement logging associated parameters include:

List of measurements;

Reporting Trigger;

Report Interval;

Report Amount;

Event Threshold;

Logging Interval;

Logging Duration;

Measurement period LTE (if either of the measurements M4, M5 is requested);

Collection period for RRM measurements LTE (present only if any of M2 or M3 measurements are requested); and Positioning method.

In the current LTE specification, it is possible for the Operations, Administration and Maintenance (OAM) unit to configure either immediate MDT measurements or logged MDT measurements, or both.

As part of the immediate MDT, the OAM can either configure the RAN to report the M1 measurements in the existing RRM measurement reports to the TCE (these RRM measurement reporting configurations are not provided by the OAM) or the OAM can configure explicit periodical or A2 events-based M1 measurement reports that the RAN forwards to the UE. In the explicit A2 event-based configurations, the OAM can provide the following reporting configuration specific information: reporting trigger (e.g., RSRP/RSRQ); report interval; report amount; and event threshold. Based on the LTE A2 event, OAM can get to know the coverage of the serving cell. The OAM can additionally configure the reportAmount to larger than one to get regular measurements from the UE when the UE is in a poor serving cell radio region.

As part of the logged MDT, the OAM can configure the UE to log serving cell and neighbor cell RSRP/RSRQ measurements. However, in NR there are beam level measurements available and the UE can include the beam level measurements also as part of the logged MDT measurements. This is an item for further study in the RAN2 #105 meeting agreements. In particular, it is for further study whether, for logged MDT, the beam-level RSRP/RSRQ should be included in the measurement logging together with cell-level RSRP/RSRQ. The details about the number of BRSRP/BRSRQ values for the serving cell and neighbour cells is also for further study.

Including all the available beam level measurements, however, will increase the logged MDP report size. Additionally, the UE will need a larger buffer to store these measurements. This might even impact the UE to store less samples as per sample measurement size is much larger due to beam level information inclusion.

SUMMARY

Certain aspects of the present disclosure and their embodiments may provide solutions to these or other challenges. For example, the present disclosure contemplates various methods to include additional configuration parameters associated to both immediate Minimization of Drive Test (MDT) and logged MDT configurations. The configurations are sent by the Operations, Administration, Management (OAM) to Radio Access Network (RAN) node so that the RAN node can configure the user equipment (UE) with these configurations for MDT purposes.

Certain embodiments may provide one or more of the following technical advantage(s). For immediate MDT, the following technical advantages may be provided. As one example, certain embodiments may advantageously permit reportOnLeave configurations in A2 event. By configuring this, the OAM need not configure the reportAMount (or set it to 1) and still get to know whether the UE is in a region where it has A2 event fulfilled or not. By configuring the reportAmount to 1, the OAM can reduce the number of measurements sent by the UE. As another example, certain embodiments may advantageously permit report QuantityRS-Indexes and maxNrofRS-IndexesToReport configurations in A2 event/periodic reporting. By having beam level information in the A2 event, the OAM can use it for some Self Optimizing Network (SON) function (e.g., the OAM can estimate which beams need to be tuned to change the coverage in a given region). As still another example, certain embodiments may advantageously permit rsType configuration in A2 event/periodic reporting. By setting the rsType to Synchronization Signal Block (SSB), the OAM can get the idle more coverage analysis from the connected mode UEs. Moreover, by setting the rsType to Channel State Information-Reference Signal (CSI-RS), OAM can analyze how different the CSI-RS coverage is compared to the SSB coverage (by having both SSB based A2 events and SI-RS based A2 events).

For logged MDT, the following technical advantages may be provided. Certain embodiments may advantageously provide different options for the OAM. The OAM can use these options to collect only the relevant beam information from the UE based on the purpose of collecting those measurements. For example, by logging the best beam index in the idle/inactive mode for the camped cell, the network gets to know the idle mode UE distribution amongst different beams of the camped cell in the coverage area. This could be mainly used for Random Access Channel (RACH) optimization. Additionally, Coverage and Capacity Optimization (CCO) functions related to antenna parameter tuning functions could also benefit from this when the network wants to change the beam directions or tilt in such a way that the idle mode UE distribution is balanced amongst the beams. As another example, by logging the best beam index in the idle/inactive mode for the camped cell and the neighboring New Radio (NR) cells, the network gets to know the idle mode UE distribution amongst different beams and the coverage overlap aspects amongst different neighbor beams. This could also be used for RACH and CCO like SON functions. As still another example, in addition to the benefits of 'beam index only' reporting, the Received Signal Received Power-based reporting provides detailed information of the coverage map of the beams of the camped cell. As yet another example, in addition to the benefits of 'camped cell only' reporting of beam Reference Signal Received Power (RSRP) measurements, reporting of neighbor beam RSRP information can be used for CCO and mobility robustness optimization (MRO) like functions. As another example, multiple beam level RSRP and Reference Signal Received Quality (RSRQ) measurements provide a clear indication of the beam relation amongst the beams of the camped cell and thus aid the network to perform antenna parameter optimization (e.g., beam pair optimization/shaping) for coverage and/or capacity reasons. As another example, having neighbor cells' beam level measurement enables the inter-cell CCO functionalities like multi-cell beam shaping functions.

In certain embodiments, depending on the purpose of enabling the logged MDT, the OAM can configure only one of these beam reporting configurations of logged MDT thus not forcing the UE to include beam level measurements for all scenarios, which takes larger buffer in the UE and also increases the logged MDT report size.

Other advantages may be readily apparent to one having skill in the art. Certain embodiments may have none, some, or all of the recited advantages.

BRIEF DESCRIPTION OF THE DRAWINGS

For a more complete understanding of the disclosed embodiments and their features and advantages, reference is now made to the following description, taken in conjunction with the accompanying drawings, in which:

FIG. 3 illustrates an example signaling flow, in accordance with certain embodiments;

FIG. 4 illustrates an example signaling flow with positioning information handling, in accordance with certain embodiments;

DETAILED DESCRIPTION

Figure 1:
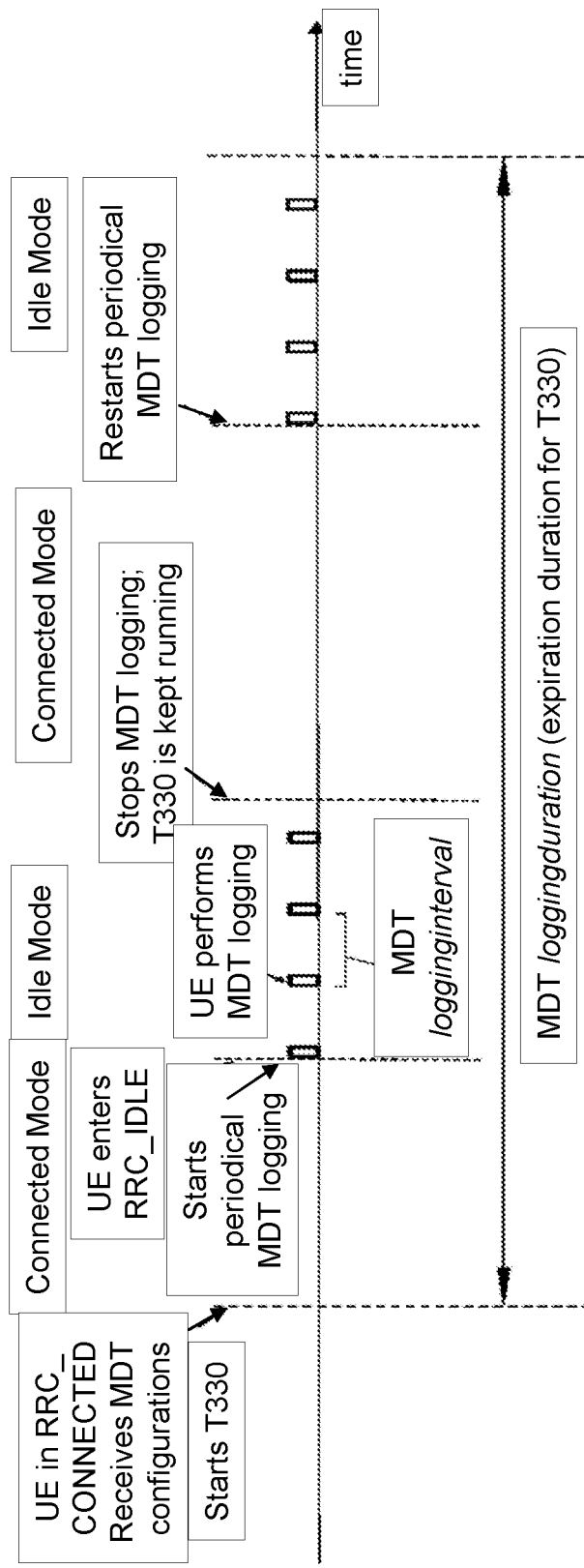
FIG. 1 illustrates an example of Minimization of Drive Test (MDT) logging.
Figure 2:
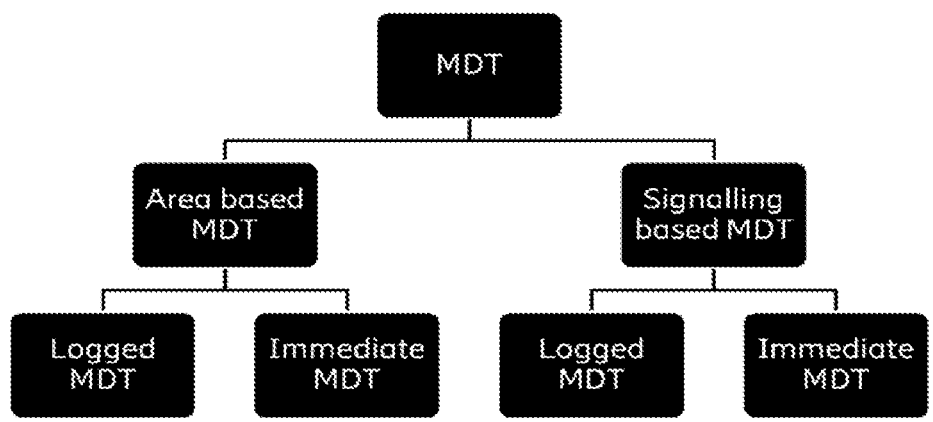
FIG. 2 illustrates the classifications of MDT.

Some of the embodiments contemplated herein will now be described more fully with reference to the accompanying drawings. Other embodiments, however, are contained within the scope of the subject matter disclosed herein, the disclosed subject matter should not be construed as limited to only the embodiments set forth herein; rather, these embodiments are provided by way of example to convey the scope of the subject matter to those skilled in the art.

Generally, all terms used herein are to be interpreted according to their ordinary meaning in the relevant technical field, unless a different meaning is clearly given and/or is implied from the context in which it is used. All references to a/an/the element, apparatus, component, means, step, etc. are to be interpreted openly as referring to at least one instance of the element, apparatus, component, means, step, etc., unless explicitly stated otherwise. The steps of any methods disclosed herein do not have to be performed in the exact order disclosed, unless a step is explicitly described as following or preceding another step and/or where it is implicit that a step must follow or precede another step. Any feature of any of the embodiments disclosed herein may be applied to any other embodiment, wherever appropriate. Likewise, any advantage of any of the embodiments may apply to any other embodiments, and vice versa. Other objectives, features and advantages of the enclosed embodiments will be apparent from the following description.

There are, proposed herein, various embodiments which address one or more of the issues disclosed herein. According to one example embodiment, Operations, Administration, Management (OAM) configures the Minimization of Drive Test (MDT) scope in a Radio Access Network (RAN) node. In some cases, the configuration may be relayed via a core network (CN) node. The MDT scope may include one or more specific report triggering conditions and/or one or more reference signal definitions. In certain embodiments, the report triggering conditions may be a report on leave condition. In certain embodiments, the reference signal type may be one of an Synchronization Signal Block (SSB), a Channel State Information-Reference Signal (CSI-RS), and a positioning reference signal (PRS). In certain embodiments, the refence signals may be part of or a subset of a set of reference signals (e.g., where each reference signal is associated to a specific beam configuration). In certain embodiments, the associated measurements may be one or more of received power, received quality, time of arrival, time difference of arrival, rich received signal waveform information including multiple path information, etc. The RAN node configures a user equipment (UE) based on the MDT scope either for immediate or logged MDT or both. The RAN node obtains an MDT report from the UE. The RAN node provides a MDT report to OAM.

Additional details concerning embodiments for the OAM configuration of MDT scope are described in more detail below.

Triggering, Reference Signals, Beams, Measurements

For immediate MDT, in certain embodiments, one or more of the following OAM configured A2 event specific configuration enhancements may be included as part of the immediate MDT configurations: reportOnLeave configurations; report QuantityRS-Indexes configurations; maxNrofRS-IndexestoReport configurations; and rsType configuration. These A2 event specific configuration enhancements may be included separately, or a combination of one or more may be included.

reportOnLeave configurations: Having the reportOnLeave configuration provides the OAM a way to know whether UE mobility actions (e.g., a handover to another cell for RLF avoidance or for load balancing purposes) were performed when the UE was in the cell edge region (e.g., as defined by the event threshold in the OAM based A2 configurations) or not.

report QuantityRS-Indexes and maxNrofRS-IndexesTo-Report configurations: Having these configurations will provide a way for the OAM to know which beam is covering the cell edge regions (e.g., as defined by the event threshold in the OAM based A2 configurations) and what are the other beam level measurements in that region (e.g., when maxNrofRS-IndexesToReport is greater than one).

rsType configuration: Setting the rsType to SSB will provide the OAM with both connected mode and idle/inactive mode coverage area analysis possibility. Setting the rsType to CSI-RS will provide the OAM with the opportunity to estimate the impact of a coverage of the connected mode CSI-RSs.

In certain embodiments, the OAM can also provide a dedicated CSI-RS configuration (e.g., CSI-RS-ResourceConfigMobility) to be included in the measurement object associated to the serving cell. This will enable the OAM to test different connected mode coverage options compared to SSB based coverages. In certain embodiments, this can also include the exact beamforming configurations that the OAM might want to configure the gNB Distributed Unit (gNB-DU) with. In certain embodiments, this can request the RAN to transmit the CSI-RSs from the serving cell that can be measured and reported by the UE (i.e., beamforming configuration to be used for CSI-RS may be up to the gNB-DU).

In certain embodiments, one or more of the following OAM configured periodic event specific configuration enhancements may be included as part of the immediate MDT configurations: report QuantityRS-Indexes configurations; maxNrofRS-IndexesToReport configurations; and rsType configurations. These periodic event specific configuration enhancements may be included separately, or a combination of one or more may be included:

report QuantityRS-Indexes and maxNrofRS-IndexesTo-Report configurations: Having these configurations will provide a way for the OAM to know which beam is covering which area in the cell coverage region and what are the other beam level measurements in that region (when maxNrofRS-IndexesToReport is greater than one).

rsType configuration: Setting the rsType to SSB will enable the OAM to generate a coverage heat map that is applicable for both connected mode and idle/inactive mode. Setting the rsType to CSI-RS will provide the OAM with the opportunity to estimate the impact of a coverage of the connected mode CSI-RSs and how it changes over the coverage area of the cell.

In certain embodiments, the OAM can also provide a dedicated CSI-RS configuration (e.g., CSI-RS-ResourceConfigMobility) to be included in the measurement object associated to the serving cell. This will enable the OAM to test different connected mode coverage options compared to SSB based coverages. In certain embodiments, this can also include the exact beamforming configurations that the OAM might want to configure the gNB-DU with. In certain embodiments, this can request the RAN to transmit the CSI-RSs from the serving cell that can be measured and reported by the UE (i.e., beamforming configuration to be used for CSI-RS may be up to the gNB-DU).

In certain embodiments, the configuration of whether the location information is requested by OAM or not in these immediate MDT configurations.

For Logged MDT:

In certain embodiments, one or more of the following OAM configured logged MDT configurations may be used.

In certain embodiments, the OAM may configure the UE to not include any beam level measurements. In some cases, this is an explicit configuration.

In certain embodiments, the OAM may configure the UE to include the best beam index of the NR camped cell only. In certain embodiments, the UE always includes the best beam index of the NR camped cell (i.e., there is no explicit OAM configuration for this).

In certain embodiments, the OAM may configure the UE to include the best beam index of the NR camped cell and the neighboring NR cells. In certain embodiments, the UE always includes the best beam index of the NR camped cell and the best beam index of the NR neighboring cells (i.e., there is no explicit OAM configuration for this).

In certain embodiments, the UE may include the best beam index of the NR camped cell. In some cases, the OAM will explicitly configure the UE to include the best beam index of the neighbor cells.

In certain embodiments, the OAM may configure the UE to include the best beam index and the beam level measurement quantity (e.g., one or more of Reference Signal Received Power (RSRP)/Reference Signal Received Quality (RSRQ)) of the NR camped cell. In certain embodiments, the UE always includes the best beam index and the beam level measurement quantity (e.g., one or more of RSRP/RSRQ) of the NR camped cell (i.e., there is no explicit OAM configuration for this).

In certain embodiments, the OAM may configure the UE to include the best beam index and the beam level measurement quantity (e.g., one or more of RSRP/RSRQ) of the NR camped cell and the neighboring NR cells. In certain embodiments, the UE always includes the best beam index and the beam level measurement quantity (e.g., one or more of RSRP/RSRQ) of the NR camped cell and the neighboring NR cells (i.e., there is no explicit OAM configuration for this). In certain embodiments, the UE may include the best beam index and the beam level measurement quantity (e.g., one or more of RSRP/RSRQ) of the NR camped cell. The OAM may explicitly configure the UE to include the best beam index and the beam level measurement quantity (e.g., one or more of RSRP/RSRQ) of the neighbor cells.

In certain embodiments, the OAM may configure the UE to include up to 'X' strongest beam indices and the respective beam level measurement quantities (e.g., one or more of RSRP/RSRQ) of the NR camped cell. In certain embodiments, the UE always includes up to 'X' strongest beam indices and the beam level measurement quantities (one or more of RSRP/RSRQ) of the NR camped cell (i.e., there is no explicit OAM configuration for this). In certain embodiments, the value of 'X' may be different for camped cell and rest of the neighbor cells (i.e., the number of beams reported for camped cell may be different from that of neighbor cells).

In certain embodiments, the OAM may configure the UE to include up to 'X' strongest beam indices and the respective beam level measurement quantities (one or more of RSRP/RSRQ) of the NR camped cell and the neighboring NR cells. In certain embodiments, the UE always includes up to 'X' strongest beam indices and the respective beam level measurement quantities (e.g., one or more of RSRP/RSRQ) of the NR camped cell and the neighboring NR cells (i.e., there is no explicit OAM configuration for this). In certain embodiments, the value of 'X' may be different for camped cell and rest of the neighbor cells (i.e., the number of beams reported for camped cell may be different from that of neighbor cells).

In certain embodiments, the UE may include up to 'X' strongest beam indices and the respective beam level measurement quantities (e.g., one or more of RSRP/RSRQ) of the NR camped cell. The OAM may explicitly configure the UE to include (or not) the 'X' strongest beam indices and the respective beam level measurement quantities (e.g., one or more of RSRP/RSRQ) of the neighbor cells. In certain embodiments, the value of 'X' may be different for camped cell and rest of the neighbor cells (i.e., the number of beams reported for camped cell may be different from that of neighbor cells).

In certain embodiments, the configuration of whether the location information is requested by OAM or not in these logged MDT configurations.

Positioning Information

In LTE, the positioning configuration is provided by the location server. In the case of UE-assisted positioning, the UE will provide positioning information to the location server in return. For MDT purposes, this is not appropriate since it is the RAN node that will summarize the MDT report to OAM.

To enable an efficient positioning information retrieval, in certain embodiments, the UE is provided with positioning assistance data from a serving RAN node. Alternatively, the positioning assistance data can be provided by the location server.

In certain embodiments, the positioning assistance data can be provided to the RAN node as described below. A core network node becomes aware of an MDT config from OAM and sends a location service request to the location server. The request may be associated to a cell or an area. When the location server obtains the request, it triggers the location server to provide a RAN node associated to a cell or an area with positioning assistance data. When the RAN node obtains the positioning assistance data from the location server, it configures a UE with the positioning assistance data. The UE obtains positioning data with MDT config, starts obtaining measurements and retrieving positioning information, and compiles the information in an MDT report.

Certain embodiments described below include positioning information from a UE perspective, a core network (CN) node perspective, a location server perspective, and/or a RAN node perspective. For example, in certain embodiments, the UE obtains positioning assistance data from either the location server or the serving RAN node, optionally together with a MDT config. The UE may measure according to the MDT config and retrieve positioning information as indicated in the positioning assistance data. The measurements and retrieval can be in connected or idle mode.

According to certain embodiments, the UE provides a MDT report to the serving RAN node including positioning information based on the positioning assistance data. The core network node may obtain a request for MDT from OAM to be forwarded to a RAN node. The core network node may send a location service request to the location server associated to a specific cell or area for the purpose of MDT. The location server may obtain a location service request from a core network node associated to a specific cell or area for the purpose of MDT. The location server provides positioning assistance data relevant for the cell or area to the RAN nodes associated to the cell or area. The RAN node obtains positioning assistance data from the location server for the purpose of MDT. The RAN node provides the positioning assistance data to a UE for the purpose of retrieving positioning information related to MDT.

Signaling

FIG. 3 illustrates an example signaling flow, in accordance with certain embodiments. At step 100, the OAM configures the MDT scope in a RAN node. In some cases, the configuration may be relayed via a core network node. The MDT scope may include one or more specific report triggering conditions and/or one or more reference signal definitions. In certain embodiments, the report triggering conditions may be a report on leave condition. In certain embodiments, the reference signal type may be one of an SSB, a CSI-RS, and a positioning reference signal (PRS). In certain embodiments, the refence signals may be part of or a subset of a set of reference signals (e.g., where each reference signal is associated to a specific beam configuration). In certain embodiments, the associated measurements may be one or more of received power, received quality, time of arrival, time difference of arrival, rich received signal waveform information including multiple path information, etc.

At step 110, the RAN node configures a UE based on the MDT scope either for immediate or logged MDT or both. At step 120, the RAN node obtains an MDT report from the UE. At step 130, the RAN node provides a MDT report to OAM.

FIG. 4 illustrates an example signaling flow with positioning information handling, in accordance with certain embodiments. At step 200, an MDT config is setup and initiated by OAM to a RAN node, via a core network node. At step 202, the core network node may trigger a location service request to the location server. The request may be associated to a cell or an area. The location server will either send positioning assistance data to a UE in the cell or area at step 208 or send positioning assistance data to a RAN node associated to a cell or an area at step 204. At step 210, the RAN node configures a UE with the positioning assistance data either separately (at step 206) or together with an MDT configuration (at step 210). At step 220, the UE gathers MDT data and positioning information and reports to the RAN node. At step 230, the RAN node sends an MDT report to OAM.

Figure 5:
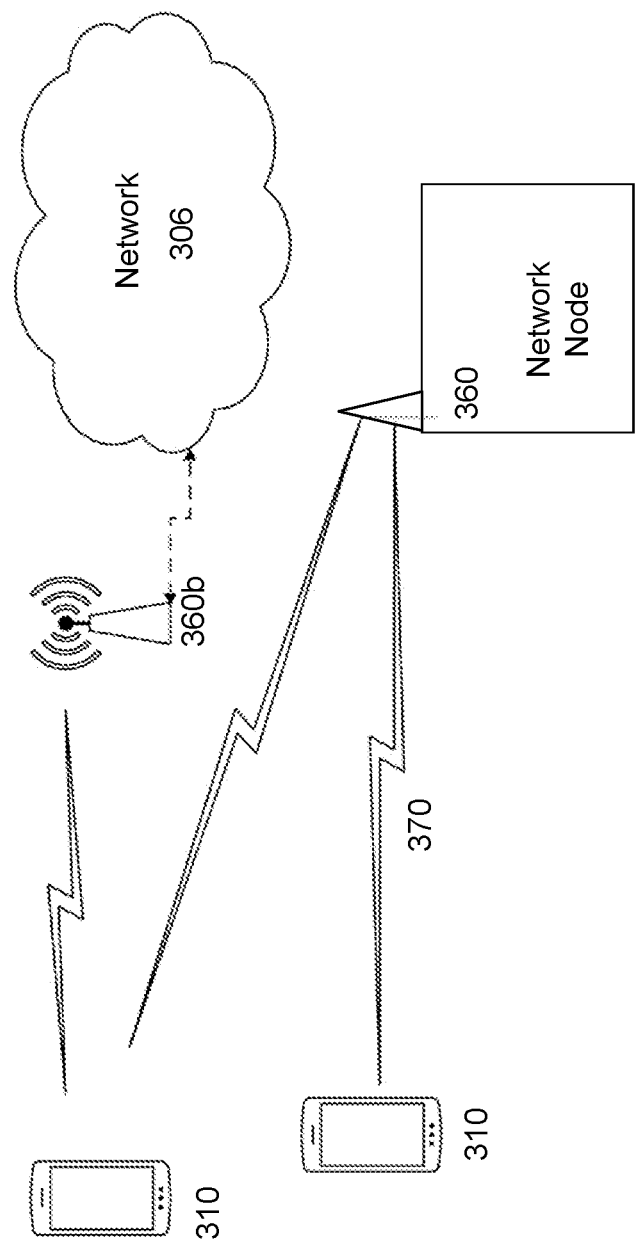
FIG. 5 illustrates an example wireless network, according to certain embodiments.

FIG. 5 illustrates an example wireless network in accordance with some embodiments. Although the subject matter described herein may be implemented in any appropriate type of system using any suitable components, the embodiments disclosed herein are described in relation to a wireless network, such as the example wireless network illustrated in FIG. 5. For simplicity, the wireless network of FIG. 5 only depicts network 306, network nodes 360 and 360b, and wireless devices 310, 310b, and 310c. In practice, a wireless network may further include any additional elements suitable to support communication between wireless devices or between a wireless device and another communication device, such as a landline telephone, a service provider, or any other network node or end device. Of the illustrated components, network node 360 and wireless device 310 are depicted with additional detail. The wireless network may provide communication and other types of services to one or more wireless devices to facilitate the wireless devices' access to and/or use of the services provided by, or via, the wireless network.

The wireless network may comprise and/or interface with any type of communication, telecommunication, data, cellular, and/or radio network or other similar type of system. In some embodiments, the wireless network may be configured to operate according to specific standards or other types of predefined rules or procedures. Thus, particular embodiments of the wireless network may implement communication standards, such as Global System for Mobile Communications (GSM), Universal Mobile Telecommunications System (UMTS), Long Term Evolution (LTE), and/or other suitable 2G, 3G, 4G, or 5G standards; wireless local area network (WLAN) standards, such as the IEEE 802.11 standards; and/or any other appropriate wireless communication standard, such as the Worldwide Interoperability for Microwave Access (WiMax), Bluetooth, Z-Wave and/or ZigBee standards.

Network 306 may comprise one or more backhaul networks, core networks, IP networks, public switched telephone networks (PSTNs), packet data networks, optical networks, wide-area networks (WANs), local area networks (LANs), wireless local area networks (WLANs), wired networks, wireless networks, metropolitan area networks, and other networks to enable communication between devices.

Network node 360 and wireless device 310 comprise various components described in more detail below. These components work together in order to provide network node and/or wireless device functionality, such as providing wireless connections in a wireless network. In different embodiments, the wireless network may comprise any number of wired or wireless networks, network nodes, base stations, controllers, wireless devices, relay stations, and/or any other components or systems that may facilitate or participate in the communication of data and/or signals whether via wired or wireless connections.

Figure 6:
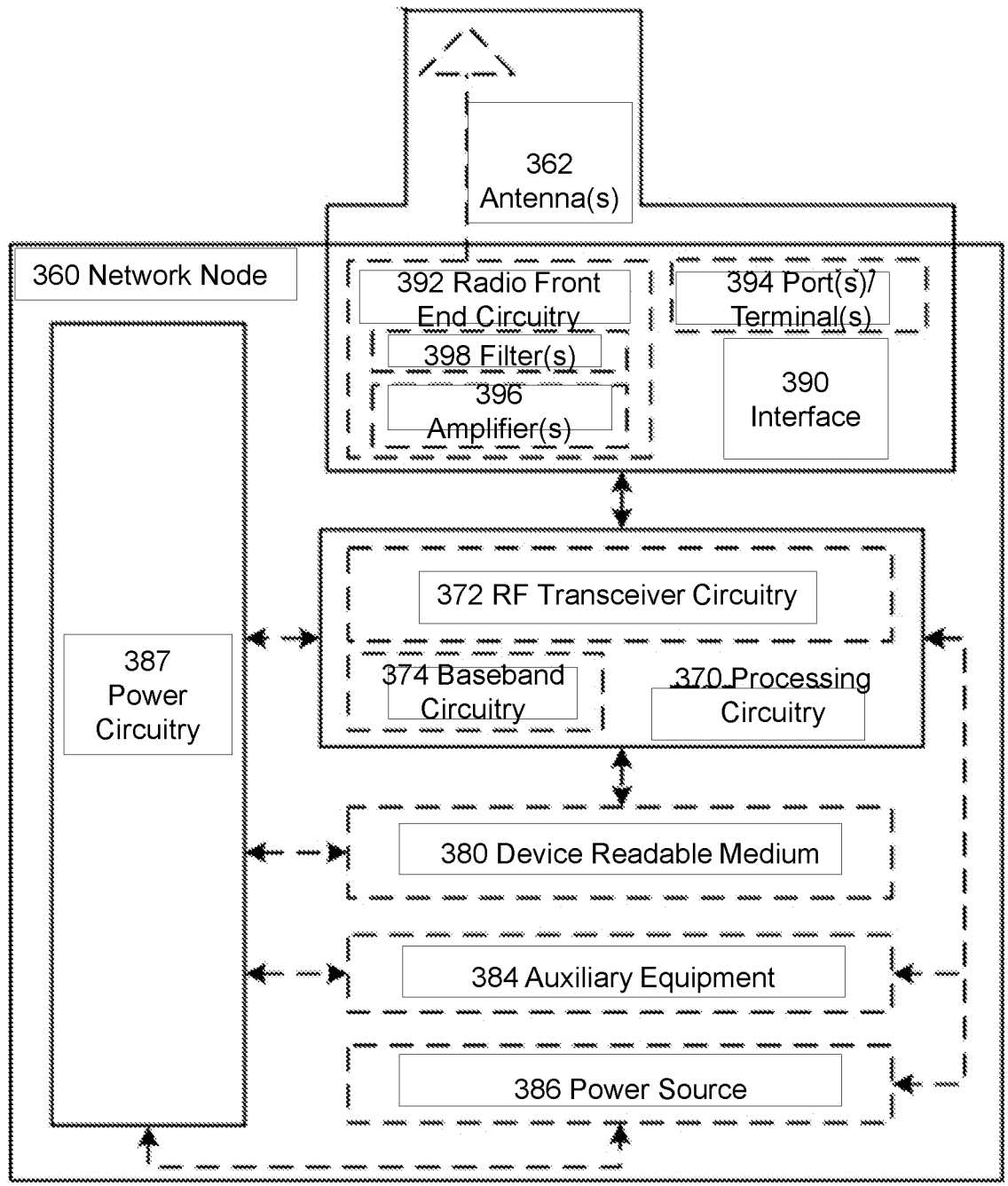
FIG. 6 illustrates an example network node, according to certain embodiments.

FIG. 6 illustrates an example network node 360, according to certain embodiments. As used herein, network node refers to equipment capable, configured, arranged and/or operable to communicate directly or indirectly with a wireless device and/or with other network nodes or equipment in the wireless network to enable and/or provide wireless access to the wireless device and/or to perform other functions (e.g., administration) in the wireless network. Examples of network nodes include, but are not limited to, access points (APs) (e.g., radio access points), base stations (BSs) (e.g., radio base stations, Node Bs, evolved Node Bs (eNBs) and NR NodeBs (gNBs)). Base stations may be categorized based on the amount of coverage they provide (or, stated differently, their transmit power level) and may then also be referred to as femto base stations, pico base stations, micro base stations, or macro base stations. A base station may be a relay node or a relay donor node controlling a relay. A network node may also include one or more (or all) parts of a distributed radio base station such as centralized digital units and/or remote radio units (RRUs), sometimes referred to as Remote Radio Heads (RRHs). Such remote radio units may or may not be integrated with an antenna as an antenna integrated radio. Parts of a distributed radio base station may also be referred to as nodes in a distributed antenna system (DAS). Yet further examples of network nodes include multi-standard radio (MSR) equipment such as MSR BSs, network controllers such as radio network controllers (RNCs) or base station controllers (BSCs), base transceiver stations (BTSs), transmission points, transmission nodes, multi-cell/multicast coordination entities (MCEs), core network nodes (e.g., MSCs, MMEs), Operations and Maintenance (O&M) nodes, Operations Support System (OSS) nodes, Self-Optimizing Network (S nodes, positioning nodes (e.g., Evolved-Serving Mobile Location Centres (E-SMLCs)), and/or MDTs. As another example, a network node may be a virtual network node as described in more detail below. More generally, however, network nodes may represent any suitable device (or group of devices) capable, configured, arranged, and/or operable to enable and/or provide a wireless device with access to the wireless network or to provide some service to a wireless device that has accessed the wireless network.

In FIG. 6, network node 360 includes processing circuitry 370, device readable medium 380, interface 390, auxiliary equipment 384, power source 386, power circuitry 387, and antenna 362. Although network node 360 illustrated in the example wireless network of FIG. 3 may represent a device that includes the illustrated combination of hardware components, other embodiments may comprise network nodes with different combinations of components. It is to be understood that a network node comprises any suitable combination of hardware and/or software needed to perform the tasks, features, functions and methods disclosed herein. Moreover, while the components of network node 360 are depicted as single boxes located within a larger box, or nested within multiple boxes, in practice, a network node may comprise multiple different physical components that make up a single illustrated component (e.g., device readable medium 380 may comprise multiple separate hard drives as well as multiple RAM modules).

Similarly, network node 360 may be composed of multiple physically separate components (e.g., a NodeB component and a RNC component, or a BTS component and a BSC component, etc.), which may each have their own respective components. In certain scenarios in which network node 360 comprises multiple separate components (e.g., BTS and BSC components), one or more of the separate components may be shared among several network nodes. For example, a single RNC may control multiple NodeB's. In such a scenario, each unique NodeB and RNC pair, may in some instances be considered a single separate network node. In some embodiments, network node 360 may be configured to support multiple radio access technologies (RATs). In such embodiments, some components may be duplicated (e.g., separate device readable medium 380 for the different RATs) and some components may be reused (e.g., the same antenna 362 may be shared by the RATs). Network node 360 may also include multiple sets of the various illustrated components for different wireless technologies integrated into network node 360, such as, for example, GSM, Wide Code Division Multiplexing Access (WCDMA), Long Term Evolution (LTE), New Radio (NR), WiFi, or Bluetooth wireless technologies. These wireless technologies may be integrated into the same or different chip or set of chips and other components within network node 360.

Processing circuitry 370 is configured to perform any determining, calculating, or similar operations (e.g., certain obtaining operations) described herein as being provided by a network node. These operations performed by processing circuitry 370 may include processing information obtained by processing circuitry 370 by, for example, converting the obtained information into other information, comparing the obtained information or converted information to information stored in the network node, and/or performing one or more operations based on the obtained information or converted information, and as a result of said processing making a determination.

Processing circuitry 370 may comprise a combination of one or more of a microprocessor, controller, microcontroller, central processing unit, digital signal processor, application-specific integrated circuit, field programmable gate array, or any other suitable computing device, resource, or combination of hardware, software and/or encoded logic operable to provide, either alone or in conjunction with other network node 360 components, such as device readable medium 380, network node 360 functionality. For example, processing circuitry 370 may execute instructions stored in device readable medium 380 or in memory within processing circuitry 370. Such functionality may include providing any of the various wireless features, functions, or benefits discussed herein. In some embodiments, processing circuitry 370 may include a system on a chip (SOC).

In some embodiments, processing circuitry 370 may include one or more of radio frequency (RF) transceiver circuitry 372 and baseband processing circuitry 374. In some embodiments, radio frequency (RF) transceiver circuitry 372 and baseband processing circuitry 374 may be on separate chips (or sets of chips), boards, or units, such as radio units and digital units. In alternative embodiments, part or all of RF transceiver circuitry 372 and baseband processing circuitry 374 may be on the same chip or set of chips, boards, or units In certain embodiments, some or all of the functionality described herein as being provided by a network node, base station, eNB or other such network device may be performed by processing circuitry 370 executing instructions stored on device readable medium 380 or memory within processing circuitry 370. In alternative embodiments, some or all of the functionality may be provided by processing circuitry 370 without executing instructions stored on a separate or discrete device readable medium, such as in a hard-wired manner. In any of those embodiments, whether executing instructions stored on a device readable storage medium or not, processing circuitry 370 can be configured to perform the described functionality. The benefits provided by such functionality are not limited to processing circuitry 370 alone or to other components of network node 360, but are enjoyed by network node 360 as a whole, and/or by end users and the wireless network generally.

Device readable medium 380 may comprise any form of volatile or non-volatile computer readable memory including, without limitation, persistent storage, solid-state memory, remotely mounted memory, magnetic media, optical media, random access memory (RAM), read-only memory (ROM), mass storage media (for example, a hard disk), removable storage media (for example, a flash drive, a Compact Disk (CD) or a Digital Video Disk (DVD)), and/or any other volatile or non-volatile, non-transitory device readable and/or computer-executable memory devices that store information, data, and/or instructions that may be used by processing circuitry 370. Device readable medium 380 may store any suitable instructions, data or information, including a computer program, software, an application including one or more of logic, rules, code, tables, etc. and/or other instructions capable of being executed by processing circuitry 370 and, utilized by network node 360. Device readable medium 380 may be used to store any calculations made by processing circuitry 370 and/or any data received via interface 390. In some embodiments, processing circuitry 370 and device readable medium 380 may be considered to be integrated.

Interface 390 is used in the wired or wireless communication of signalling and/or data between network node 360, network 306, and/or wireless devices 310. As illustrated, interface 390 comprises port(s)/terminal(s) 394 to send and receive data, for example to and from network 306 over a wired connection. Interface 390 also includes radio front end circuitry 392 that may be coupled to, or in certain embodiments a part of, antenna 362. Radio front end circuitry 392 comprises filters 398 and amplifiers 396. Radio front end circuitry 392 may be connected to antenna 362 and processing circuitry 370. Radio front end circuitry may be configured to condition signals communicated between antenna 362 and processing circuitry 370. Radio front end circuitry 392 may receive digital data that is to be sent out to other network nodes or wireless devices via a wireless connection. Radio front end circuitry 392 may convert the digital data into a radio signal having the appropriate channel and bandwidth parameters using a combination of filters 398 and/or amplifiers 396. The radio signal may then be transmitted via antenna 362. Similarly, when receiving data, antenna 362 may collect radio signals which are then converted into digital data by radio front end circuitry 392. The digital data may be passed to processing circuitry 370. In other embodiments, the interface may comprise different components and/or different combinations of components.

In certain alternative embodiments, network node 360 may not include separate radio front end circuitry 392, instead, processing circuitry 370 may comprise radio front end circuitry and may be connected to antenna 362 without separate radio front end circuitry 392. Similarly, in some embodiments, all or some of RF transceiver circuitry 372 may be considered a part of interface 390. In still other embodiments, interface 390 may include one or more ports or terminals 394, radio front end circuitry 392, and RF transceiver circuitry 372, as part of a radio unit (not shown), and interface 390 may communicate with baseband processing circuitry 374, which is part of a digital unit (not shown).

Antenna 362 may include one or more antennas, or antenna arrays, configured to send and/or receive wireless signals. Antenna 362 may be coupled to radio front end circuitry 390 and may be any type of antenna capable of transmitting and receiving data and/or signals wirelessly. In some embodiments, antenna 362 may comprise one or more omni-directional, sector or panel antennas operable to transmit/receive radio signals between, for example, 2 GHz and 66 GHz. An omni-directional antenna may be used to transmit/receive radio signals in any direction, a sector antenna may be used to transmit/receive radio signals from devices within a particular area, and a panel antenna may be a line of sight antenna used to transmit/receive radio signals in a relatively straight line. In some instances, the use of more than one antenna may be referred to as MIMO. In certain embodiments, antenna 362 may be separate from network node 360 and may be connectable to network node 360 through an interface or port.

Antenna 362, interface 390, and/or processing circuitry 370 may be configured to perform any receiving operations and/or certain obtaining operations described herein as being performed by a network node. Any information, data and/or signals may be received from a wireless device, another network node and/or any other network equipment. Similarly, antenna 362, interface 390, and/or processing circuitry 370 may be configured to perform any transmitting operations described herein as being performed by a network node. Any information, data and/or signals may be transmitted to a wireless device, another network node and/or any other network equipment.

Power circuitry 387 may comprise, or be coupled to, power management circuitry and is configured to supply the components of network node 360 with power for performing the functionality described herein. Power circuitry 387 may receive power from power source 386. Power source 386 and/or power circuitry 387 may be configured to provide power to the various components of network node 360 in a form suitable for the respective components (e.g., at a voltage and current level needed for each respective component). Power source 386 may either be included in, or external to, power circuitry 387 and/or network node 360. For example, network node 360 may be connectable to an external power source (e.g., an electricity outlet) via an input circuitry or interface such as an electrical cable, whereby the external power source supplies power to power circuitry 387. As a further example, power source 386 may comprise a source of power in the form of a battery or battery pack which is connected to, or integrated in, power circuitry 387. The battery may provide backup power should the external power source fail. Other types of power sources, such as photovoltaic devices, may also be used.

Alternative embodiments of network node 360 may include additional components beyond those shown in FIG. 6 that may be responsible for providing certain aspects of the network node's functionality, including any of the functionality described herein and/or any functionality necessary to support the subject matter described herein. For example, network node 360 may include user interface equipment to allow input of information into network node 360 and to allow output of information from network node 360. This may allow a user to perform diagnostic, maintenance, repair, and other administrative functions for network node 360.

Figure 7:
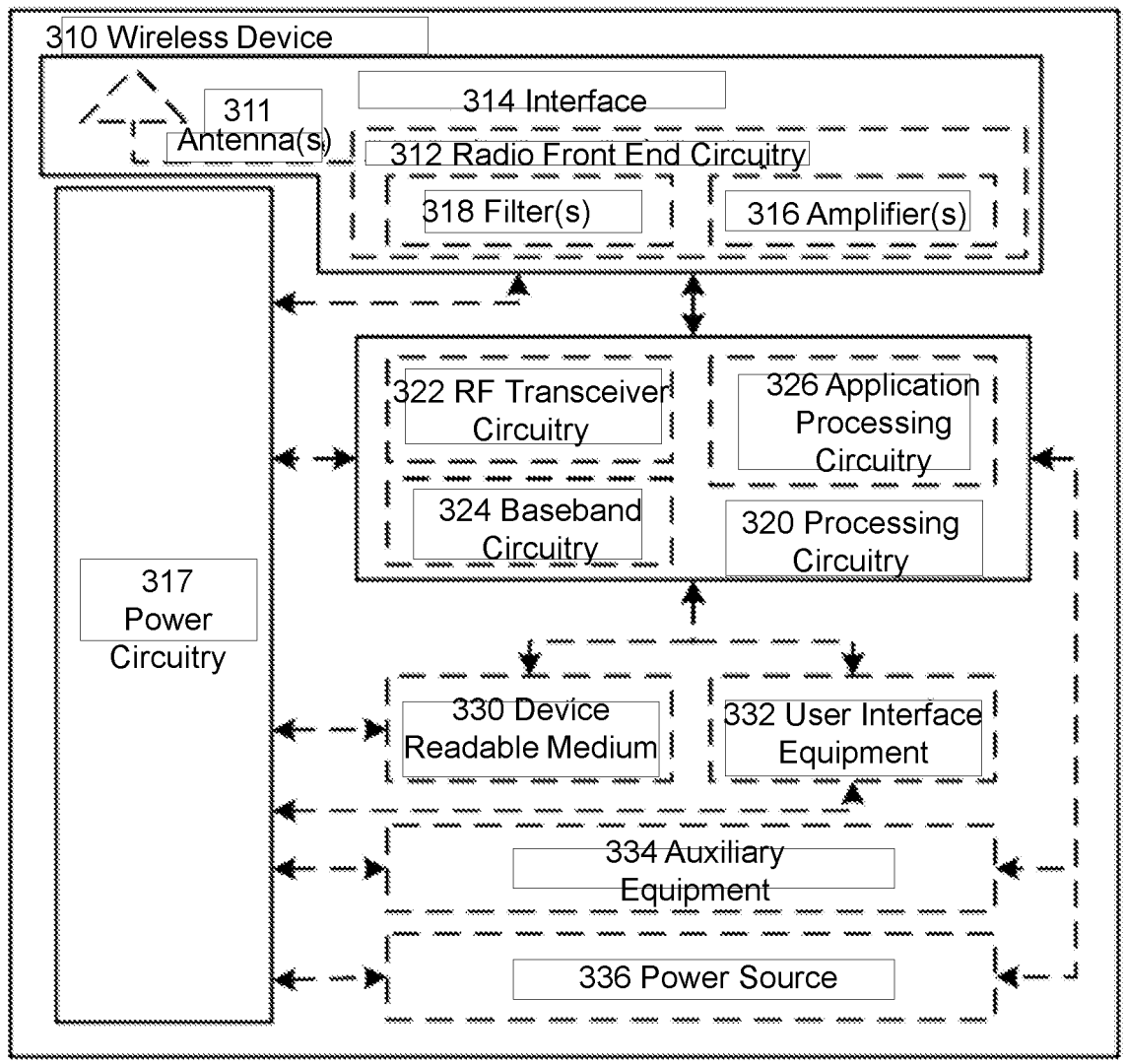
FIG. 7 illustrates an example wireless device, according to certain embodiments.

FIG. 7 illustrates a wireless device 310, according to certain embodiments. As used herein, wireless device refers to a device capable, configured, arranged and/or operable to communicate wirelessly with network nodes and/or other wireless devices. Unless otherwise noted, the term wireless device may be used interchangeably herein with user equipment (UE). Communicating wirelessly may involve transmitting and/or receiving wireless signals using electromagnetic waves, radio waves, infrared waves, and/or other types of signals suitable for conveying information through air. In some embodiments, a wireless device may be configured to transmit and/or receive information without direct human interaction. For instance, a wireless device may be designed to transmit information to a network on a predetermined schedule, when triggered by an internal or external event, or in response to requests from the network. Examples of a wireless device include, but are not limited to, a smart phone, a mobile phone, a cell phone, a voice over IP (VoIP) phone, a wireless local loop phone, a desktop computer, a personal digital assistant (PDA), a wireless cameras, a gaming console or device, a music storage device, a playback appliance, a wearable terminal device, a wireless endpoint, a mobile station, a tablet, a laptop, a laptop-embedded equipment (LEE), a laptop-mounted equipment (LME), a smart device, a wireless customer-premise equipment (CPE). a vehicle-mounted wireless terminal device, etc. A wireless device may support device-to-device (D2D) communication, for example by implementing a 3GPP standard for sidelink communication, vehicle-to-vehicle (V2V), vehicle-to-infrastructure (V2I), vehicle-to-everything (V2X) and may in this case be referred to as a D2D communication device. As yet another specific example, in an Internet of Things (IoT) scenario, a wireless device may represent a machine or other device that performs monitoring and/or measurements, and transmits the results of such monitoring and/or measurements to another wireless device and/or a network node. The wireless device may in this case be a machine-to-machine (M2M) device, which may in a 3GPP context be referred to as an MTC device. As one particular example, the wireless device may be a UE implementing the 3GPP narrow band internet of things (NB-IoT) standard. Particular examples of such machines or devices are sensors, metering devices such as power meters, industrial machinery, or home or personal appliances (e.g. refrigerators, televisions, etc.) personal wearables (e.g., watches, fitness trackers, etc.). In other scenarios, a wireless device may represent a vehicle or other equipment that is capable of monitoring and/or reporting on its operational status or other functions associated with its operation. A wireless device as described above may represent the endpoint of a wireless connection, in which case the device may be referred to as a wireless terminal. Furthermore, a wireless device as described above may be mobile, in which case it may also be referred to as a mobile device or a mobile terminal.

As illustrated, wireless device 310 includes antenna 311, interface 314, processing circuitry 320, device readable medium 330, user interface equipment 332, auxiliary equipment 334, power source 336 and power circuitry 337. Wireless device 310 may include multiple sets of one or more of the illustrated components for different wireless technologies supported by wireless device 310, such as, for example, GSM, WCDMA, LTE, NR, WiFi, WiMAX, or Bluetooth wireless technologies, just to mention a few. These wireless technologies may be integrated into the same or different chips or set of chips as other components within wireless device 310.

Antenna 311 may include one or more antennas or antenna arrays, configured to send and/or receive wireless signals, and is connected to interface 314. In certain alternative embodiments, antenna 311 may be separate from wireless device 310 and be connectable to wireless device 310 through an interface or port. Antenna 311, interface 314, and/or processing circuitry 320 may be configured to perform any receiving or transmitting operations described herein as being performed by a wireless device. Any information, data and/or signals may be received from a network node and/or another wireless device. In some embodiments, radio front end circuitry and/or antenna 311 may be considered an interface.

As illustrated, interface 314 comprises radio front end circuitry 312 and antenna 311. Radio front end circuitry 312 comprise one or more filters 318 and amplifiers 316. Radio front end circuitry 314 is connected to antenna 311 and processing circuitry 320, and is configured to condition signals communicated between antenna 311 and processing circuitry 320. Radio front end circuitry 312 may be coupled to or a part of antenna 311. In some embodiments, wireless device 310 may not include separate radio front end circuitry 312; rather, processing circuitry 320 may comprise radio front end circuitry and may be connected to antenna 311. Similarly, in some embodiments, some or all of RF transceiver circuitry 322 may be considered a part of interface 314. Radio front end circuitry 312 may receive digital data that is to be sent out to other network nodes or wireless devices via a wireless connection. Radio front end circuitry 312 may convert the digital data into a radio signal having the appropriate channel and bandwidth parameters using a combination of filters 318 and/or amplifiers 316. The radio signal may then be transmitted via antenna 311. Similarly, when receiving data, antenna 311 may collect radio signals which are then converted into digital data by radio front end circuitry 312. The digital data may be passed to processing circuitry 320. In other embodiments, the interface may comprise different components and/or different combinations of components.

Processing circuitry 320 may comprise a combination of one or more of a microprocessor, controller, microcontroller, central processing unit, digital signal processor, application-specific integrated circuit, field programmable gate array, or any other suitable computing device, resource, or combination of hardware, software, and/or encoded logic operable to provide, either alone or in conjunction with other wireless device 310 components, such as device readable medium 330, wireless device 310 functionality. Such functionality may include providing any of the various wireless features or benefits discussed herein. For example, processing circuitry 320 may execute instructions stored in device readable medium 330 or in memory within processing circuitry 320 to provide the functionality disclosed herein.

As illustrated, processing circuitry 320 includes one or more of RF transceiver circuitry 322, baseband processing circuitry 324, and application processing circuitry 326. In other embodiments, the processing circuitry may comprise different components and/or different combinations of components. In certain embodiments processing circuitry 320 of wireless device 310 may comprise a SOC. In some embodiments, RF transceiver circuitry 322, baseband processing circuitry 324, and application processing circuitry 326 may be on separate chips or sets of chips. In alternative embodiments, part or all of baseband processing circuitry 324 and application processing circuitry 326 may be combined into one chip or set of chips, and RF transceiver circuitry 322 may be on a separate chip or set of chips. In still alternative embodiments, part or all of RF transceiver circuitry 322 and baseband processing circuitry 324 may be on the same chip or set of chips, and application processing circuitry 326 may be on a separate chip or set of chips. In yet other alternative embodiments, part or all of RF transceiver circuitry 322, baseband processing circuitry 324, and application processing circuitry 326 may be combined in the same chip or set of chips. In some embodiments, RF transceiver circuitry 322 may be a part of interface 314. RF transceiver circuitry 322 may condition RF signals for processing circuitry 320.

In certain embodiments, some or all of the functionality described herein as being performed by a wireless device may be provided by processing circuitry 320 executing instructions stored on device readable medium 330, which in certain embodiments may be a computer-readable storage medium. In alternative embodiments, some or all of the functionality may be provided by processing circuitry 320 without executing instructions stored on a separate or discrete device readable storage medium, such as in a hard-wired manner. In any of those particular embodiments, whether executing instructions stored on a device readable storage medium or not, processing circuitry 320 can be configured to perform the described functionality. The benefits provided by such functionality are not limited to processing circuitry 320 alone or to other components of wireless device 310, but are enjoyed by wireless device 310 as a whole, and/or by end users and the wireless network generally.

Processing circuitry 320 may be configured to perform any determining, calculating, or similar operations (e.g., certain obtaining operations) described herein as being performed by a wireless device. These operations, as performed by processing circuitry 320, may include processing information obtained by processing circuitry 320 by, for example, converting the obtained information into other information, comparing the obtained information or converted information to information stored by wireless device 310, and/or performing one or more operations based on the obtained information or converted information, and as a result of said processing making a determination.

Device readable medium 330 may be operable to store a computer program, software, an application including one or more of logic, rules, code, tables, etc. and/or other instructions capable of being executed by processing circuitry 320. Device readable medium 330 may include computer memory (e.g., Random Access Memory (RAM) or Read Only Memory (ROM)), mass storage media (e.g., a hard disk), removable storage media (e.g., a Compact Disk (CD) or a Digital Video Disk (DVD)), and/or any other volatile or non-volatile, non-transitory device readable and/or computer executable memory devices that store information, data, and/or instructions that may be used by processing circuitry 320. In some embodiments, processing circuitry 320 and device readable medium 330 may be considered to be integrated.

User interface equipment 332 may provide components that allow for a human user to interact with wireless device 310. Such interaction may be of many forms, such as visual, audial, tactile, etc. User interface equipment 332 may be operable to produce output to the user and to allow the user to provide input to wireless device 310. The type of interaction may vary depending on the type of user interface equipment 332 installed in wireless device 310. For example, if wireless device 310 is a smart phone, the interaction may be via a touch screen; if wireless device 310 is a smart meter, the interaction may be through a screen that provides usage (e.g., the number of gallons used) or a speaker that provides an audible alert (e.g., if smoke is detected). User interface equipment 332 may include input interfaces, devices and circuits, and output interfaces, devices and circuits. User interface equipment 332 is configured to allow input of information into wireless device 310, and is connected to processing circuitry 320 to allow processing circuitry 320 to process the input information. User interface equipment 332 may include, for example, a microphone, a proximity or other sensor, keys/buttons, a touch display, one or more cameras, a USB port, or other input circuitry. User interface equipment 332 is also configured to allow output of information from wireless device 310, and to allow processing circuitry 320 to output information from wireless device 310. User interface equipment 332 may include, for example, a speaker, a display, vibrating circuitry, a USB port, a headphone interface, or other output circuitry. Using one or more input and output interfaces, devices, and circuits, of user interface equipment 332, wireless device 310 may communicate with end users and/or the wireless network, and allow them to benefit from the functionality described herein.

Auxiliary equipment 334 is operable to provide more specific functionality which may not be generally performed by wireless devices. This may comprise specialized sensors for doing measurements for various purposes, interfaces for additional types of communication such as wired communications etc. The inclusion and type of components of auxiliary equipment 334 may vary depending on the embodiment and/or scenario.

Power source 336 may, in some embodiments, be in the form of a battery or battery pack. Other types of power sources, such as an external power source (e.g., an electricity outlet), photovoltaic devices or power cells, may also be used. wireless device 310 may further comprise power circuitry 337 for delivering power from power source 336 to the various parts of wireless device 310 which need power from power source 336 to carry out any functionality described or indicated herein. Power circuitry 337 may in certain embodiments comprise power management circuitry. Power circuitry 337 may additionally or alternatively be operable to receive power from an external power source; in which case wireless device 310 may be connectable to the external power source (such as an electricity outlet) via input circuitry or an interface such as an electrical power cable. Power circuitry 337 may also in certain embodiments be operable to deliver power from an external power source to power source 336. This may be, for example, for the charging of power source 336. Power circuitry 337 may perform any formatting, converting, or other modification to the power from power source 336 to make the power suitable for the respective components of wireless device 310 to which power is supplied.

Figure 8:
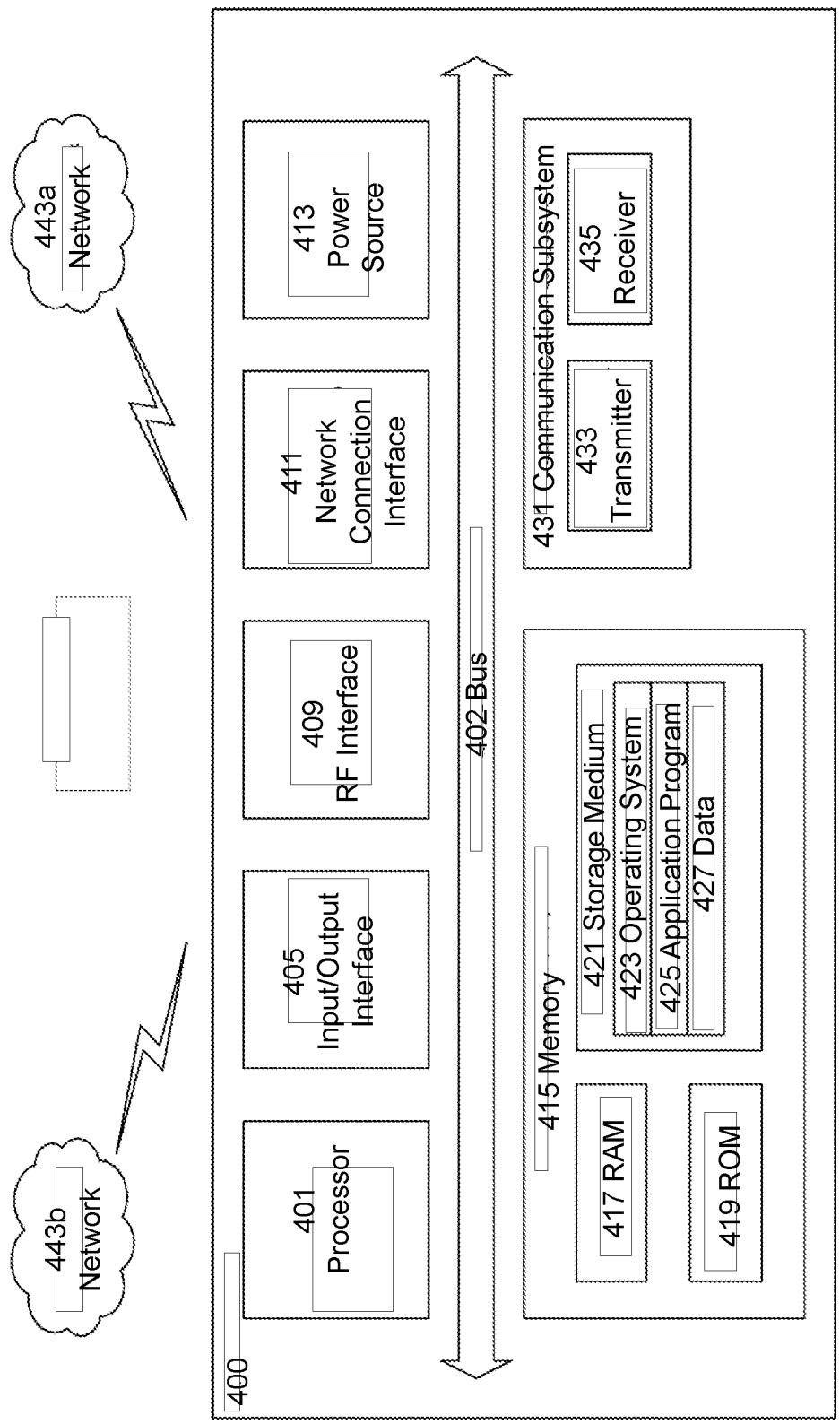
FIG. 8 illustrate an example user equipment, according to certain embodiments.

FIG. 8 illustrates one embodiment of a UE in accordance with various aspects described herein. As used herein, a user equipment or UE may not necessarily have a user in the sense of a human user who owns and/or operates the relevant device. Instead, a UE may represent a device that is intended for sale to, or operation by, a human user but which may not, or which may not initially, be associated with a specific human user (e.g., a smart sprinkler controller). Alternatively, a UE may represent a device that is not intended for sale to, or operation by, an end user but which may be associated with or operated for the benefit of a user (e.g., a smart power meter). UE 400 may be any UE identified by the $3^{rd}$ Generation Partnership Project (3GPP), including a NB-IoT UE, a machine type communication (MTC) UE, and/or an enhanced MTC (eMTC) UE. UE 400, as illustrated in FIG. 8, is one example of a wireless device configured for communication in accordance with one or more communication standards promulgated by the $3^{rd}$ Generation Partnership Project (3GPP), such as 3GPP's GSM, UMTS, LTE, and/or 5G standards. As mentioned previously, the term wireless device and UE may be used interchangeable. Accordingly, although FIG. 8 is a UE, the components discussed herein are equally applicable to a wireless device, and vice-versa.

In FIG. 8, UE 400 includes processing circuitry 401 that is operatively coupled to input/output interface 405, radio frequency (RF) interface 409, network connection interface 411, memory 415 including random access memory (RAM) 417, read-only memory (ROM) 419, and storage medium 421 or the like, communication subsystem 431, power source 433, and/or any other component, or any combination thereof. Storage medium 421 includes operating system 423, application program 425, and data 427. In other embodiments, storage medium 421 may include other similar types of information. Certain UEs may utilize all of the components shown in FIG. 8, or only a subset of the components. The level of integration between the components may vary from one UE to another UE. Further, certain UEs may contain multiple instances of a component, such as multiple processors, memories, transceivers, transmitters, receivers, etc.

In FIG. 8, processing circuitry 401 may be configured to process computer instructions and data. Processing circuitry 401 may be configured to implement any sequential state machine operative to execute machine instructions stored as machine-readable computer programs in the memory, such as one or more hardware-implemented state machines (e.g., in discrete logic, FPGA, ASIC, etc.); programmable logic together with appropriate firmware; one or more stored program, general-purpose processors, such as a microprocessor or Digital Signal Processor (DSP), together with appropriate software; or any combination of the above. For example, the processing circuitry 401 may include two central processing units (CPUs). Data may be information in a form suitable for use by a computer.

In the depicted embodiment, input/output interface 405 may be configured to provide a communication interface to an input device, output device, or input and output device. UE 400 may be configured to use an output device via input/output interface 405. An output device may use the same type of interface port as an input device. For example, a USB port may be used to provide input to and output from UE 400. The output device may be a speaker, a sound card, a video card, a display, a monitor, a printer, an actuator, an emitter, a smartcard, another output device, or any combination thereof. UE 400 may be configured to use an input device via input/output interface 405 to allow a user to capture information into UE 400. The input device may include a touch-sensitive or presence-sensitive display, a camera (e.g., a digital camera, a digital video camera, a web camera, etc.), a microphone, a sensor, a mouse, a trackball, a directional pad, a trackpad, a scroll wheel, a smartcard, and the like. The presence-sensitive display may include a capacitive or resistive touch sensor to sense input from a user. A sensor may be, for instance, an accelerometer, a gyroscope, a tilt sensor, a force sensor, a magnetometer, an optical sensor, a proximity sensor, another like sensor, or any combination thereof. For example, the input device may be an accelerometer, a magnetometer, a digital camera, a microphone, and an optical sensor.

In FIG. 8, RF interface 409 may be configured to provide a communication interface to RF components such as a transmitter, a receiver, and an antenna. Network connection interface 411 may be configured to provide a communication interface to network 443a. Network 443a may encompass wired and/or wireless networks such as a local-area network (LAN), a wide-area network (WAN), a computer network, a wireless network, a telecommunications network, another like network or any combination thereof. For example, network 443a may comprise a Wi-Fi network. Network connection interface 411 may be configured to include a receiver and a transmitter interface used to communicate with one or more other devices over a communication network according to one or more communication protocols, such as Ethernet, TCP/IP, SONET, ATM, or the like. Network connection interface 411 may implement receiver and transmitter functionality appropriate to the communication network links (e.g., optical, electrical, and the like). The transmitter and receiver functions may share circuit components, software or firmware, or alternatively may be implemented separately.

RAM 417 may be configured to interface via bus 402 to processing circuitry 401 to provide storage or caching of data or computer instructions during the execution of software programs such as the operating system, application programs, and device drivers. ROM 419 may be configured to provide computer instructions or data to processing circuitry 401. For example, ROM 419 may be configured to store invariant low-level system code or data for basic system functions such as basic input and output (I/O), startup, or reception of keystrokes from a keyboard that are stored in a non-volatile memory. Storage medium 421 may be configured to include memory such as RAM, ROM, programmable read-only memory (PROM), erasable programmable read-only memory (EPROM), electrically erasable programmable read-only memory (EEPROM), magnetic disks, optical disks, floppy disks, hard disks, removable cartridges, or flash drives. In one example, storage medium 421 may be configured to include operating system 423, application program 425 such as a web browser application, a widget or gadget engine or another application, and data file 427. Storage medium 421 may store, for use by UE 400, any of a variety of various operating systems or combinations of operating systems.

Storage medium 421 may be configured to include a number of physical drive units, such as redundant array of independent disks (RAID), floppy disk drive, flash memory, USB flash drive, external hard disk drive, thumb drive, pen drive, key drive, high-density digital versatile disc (HD-DVD) optical disc drive, internal hard disk drive, Blu-Ray optical disc drive, holographic digital data storage (HDDS) optical disc drive, external mini-dual in-line memory module (DIMM), synchronous dynamic random access memory (SDRAM), external micro-DIMM SDRAM, smartcard memory such as a subscriber identity module or a removable user identity (SIM/RUIM) module, other memory, or any combination thereof. Storage medium 421 may allow UE 400 to access computer-executable instructions, application programs or the like, stored on transitory or non-transitory memory media, to off-load data, or to upload data. An article of manufacture, such as one utilizing a communication system may be tangibly embodied in storage medium 421, which may comprise a device readable medium.

In FIG. 8, processing circuitry 401 may be configured to communicate with network 443b using communication subsystem 431. Network 443a and network 443b may be the same network or networks or different network or networks. Communication subsystem 431 may be configured to include one or more transceivers used to communicate with network 443b. For example, communication subsystem 431 may be configured to include one or more transceivers used to communicate with one or more remote transceivers of another device capable of wireless communication such as another wireless device, UE, or base station of a radio access network (RAN) according to one or more communication protocols, such as IEEE 802.11, CDMA, WCDMA, GSM, LTE, UTRAN, WiMax, or the like. Each transceiver may include transmitter 433 and/or receiver 435 to implement transmitter or receiver functionality, respectively, appropriate to the RAN links (e.g., frequency allocations and the like). Further, transmitter 433 and receiver 435 of each transceiver may share circuit components, software or firmware, or alternatively may be implemented separately.

In the illustrated embodiment, the communication functions of communication subsystem 431 may include data communication, voice communication, multimedia communication, short-range communications such as Bluetooth, near-field communication, location-based communication such as the use of the global positioning system (GPS) to determine a location, another like communication function, or any combination thereof. For example, communication subsystem 431 may include cellular communication, Wi-Fi communication, Bluetooth communication, and GPS communication. Network 443b may encompass wired and/or wireless networks such as a local-area network (LAN), a wide-area network (WAN), a computer network, a wireless network, a telecommunications network, another like network or any combination thereof. For example, network 443b may be a cellular network, a Wi-Fi network, and/or a near-field network. Power source 413 may be configured to provide alternating current (AC) or direct current (DC) power to components of UE 400.

The features, benefits and/or functions described herein may be implemented in one of the components of UE 400 or partitioned across multiple components of UE 400. Further, the features, benefits, and/or functions described herein may be implemented in any combination of hardware, software or firmware. In one example, communication subsystem 431 may be configured to include any of the components described herein. Further, processing circuitry 401 may be configured to communicate with any of such components over bus 402. In another example, any of such components may be represented by program instructions stored in memory that when executed by processing circuitry 401 perform the corresponding functions described herein. In another example, the functionality of any of such components may be partitioned between processing circuitry 401 and communication subsystem 431. In another example, the non-computationally intensive functions of any of such components may be implemented in software or firmware and the computationally intensive functions may be implemented in hardware.

Figure 9:
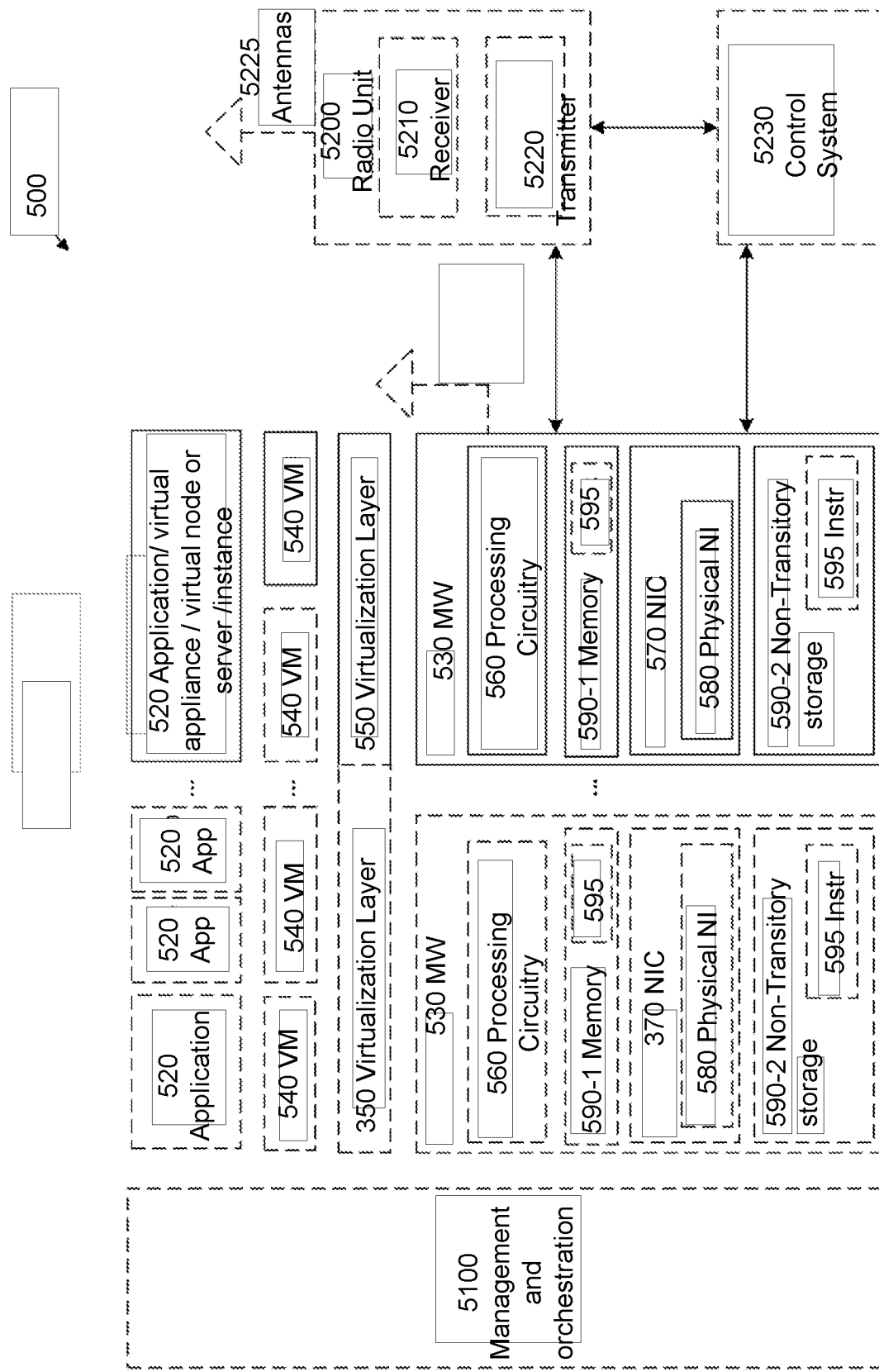
FIG. 9 illustrates a virtualization environment in which functions implemented by some embodiments may be virtualized, according to certain embodiments.

FIG. 9 is a schematic block diagram illustrating a virtualization environment 500 in which functions implemented by some embodiments may be virtualized. In the present context, virtualizing means creating virtual versions of apparatuses or devices which may include virtualizing hardware platforms, storage devices and networking resources. As used herein, virtualization can be applied to a node (e.g., a virtualized base station or a virtualized radio access node) or to a device (e.g., a UE, a wireless device or any other type of communication device) or components thereof and relates to an implementation in which at least a portion of the functionality is implemented as one or more virtual components (e.g., via one or more applications, components, functions, virtual machines or containers executing on one or more physical processing nodes in one or more networks).

In some embodiments, some or all of the functions described herein may be implemented as virtual components executed by one or more virtual machines implemented in one or more virtual environments 500 hosted by one or more of hardware nodes 530. Further, in embodiments in which the virtual node is not a radio access node or does not require radio connectivity (e.g., a core network node), then the network node may be entirely virtualized.

The functions may be implemented by one or more applications 520 (which may alternatively be called software instances, virtual appliances, network functions, virtual nodes, virtual network functions, etc.) operative to implement some of the features, functions, and/or benefits of some of the embodiments disclosed herein. Applications 520 are run in virtualization environment 500 which provides hardware 530 comprising processing circuitry 560 and memory 590. Memory 590 contains instructions 595 executable by processing circuitry 560 whereby application 520 is operative to provide one or more of the features, benefits, and/or functions disclosed herein.

Virtualization environment 500, comprises general-purpose or special-purpose network hardware devices 530 comprising a set of one or more processors or processing circuitry 560, which may be commercial off-the-shelf (COTS) processors, dedicated Application Specific Integrated Circuits (ASICs), or any other type of processing circuitry including digital or analog hardware components or special purpose processors. Each hardware device may comprise memory 590-1 which may be non-persistent memory for temporarily storing instructions 595 or software executed by processing circuitry 560. Each hardware device may comprise one or more network interface controllers (NICs) 570, also known as network interface cards, which include physical network interface 580. Each hardware device may also include non-transitory, persistent, machine-readable storage media 590-2 having stored therein software 595 and/or instructions executable by processing circuitry 560. Software 595 may include any type of software including software for instantiating one or more virtualization layers 550 (also referred to as hypervisors), software to execute virtual machines 540 as well as software allowing it to execute functions, features and/or benefits described in relation with some embodiments described herein.

Virtual machines 540, comprise virtual processing, virtual memory, virtual networking or interface and virtual storage, and may be run by a corresponding virtualization layer 550 or hypervisor. Different embodiments of the instance of virtual appliance 520 may be implemented on one or more of virtual machines 540, and the implementations may be made in different ways.

During operation, processing circuitry 560 executes software 595 to instantiate the hypervisor or virtualization layer 550, which may sometimes be referred to as a virtual machine monitor (VMM). Virtualization layer 550 may present a virtual operating platform that appears like networking hardware to virtual machine 540.

As shown in FIG. 9, hardware 530 may be a standalone network node with generic or specific components. Hardware 530 may comprise antenna 5225 and may implement some functions via virtualization. Alternatively, hardware 530 may be part of a larger cluster of hardware (e.g. such as in a data center or customer premise equipment (CPE)) where many hardware nodes work together and are managed via management and orchestration (MANO) 5100, which, among others, oversees lifecycle management of applications 520.

Virtualization of the hardware is in some contexts referred to as network function virtualization (NFV). NFV may be used to consolidate many network equipment types onto industry standard high volume server hardware, physical switches, and physical storage, which can be located in data centers, and customer premise equipment.

In the context of NFV, virtual machine 540 may be a software implementation of a physical machine that runs programs as if they were executing on a physical, non-virtualized machine. Each of virtual machines 540, and that part of hardware 530 that executes that virtual machine, be it hardware dedicated to that virtual machine and/or hardware shared by that virtual machine with others of the virtual machines 540, forms a separate virtual network elements (VNE).

Still in the context of NFV, Virtual Network Function (VNF) is responsible for handling specific network functions that run in one or more virtual machines 540 on top of hardware networking infrastructure 530 and corresponds to application 520 in FIG. 9.

In some embodiments, one or more radio units 5200 that each include one or more transmitters 5220 and one or more receivers 5210 may be coupled to one or more antennas 5225. Radio units 5200 may communicate directly with hardware nodes 530 via one or more appropriate network interfaces and may be used in combination with the virtual components to provide a virtual node with radio capabilities, such as a radio access node or a base station.

In some embodiments, some signalling can be effected with the use of control system 5230 which may alternatively be used for communication between the hardware nodes 530 and radio units 5200.

Figure 10:
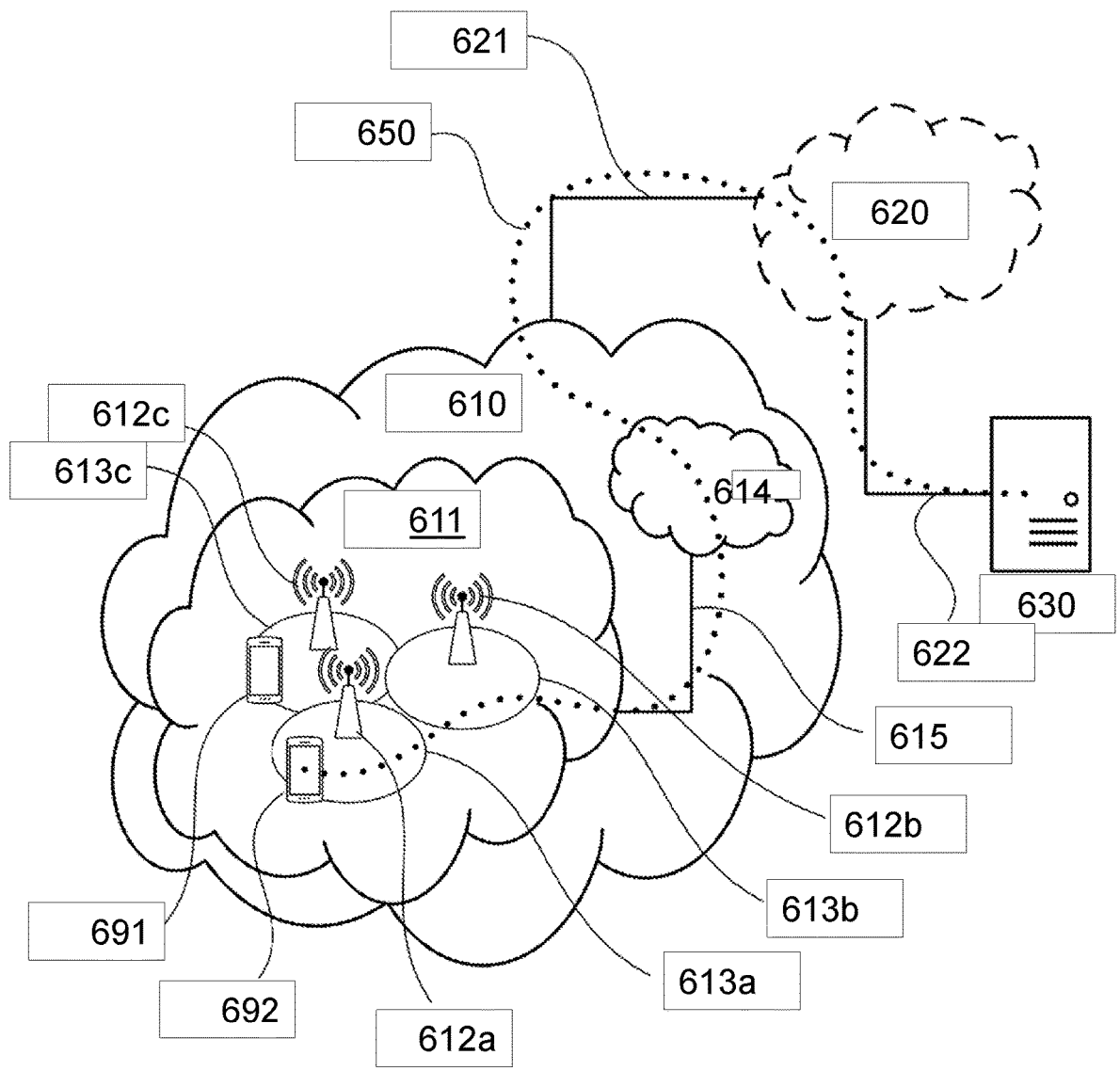
FIG. 10 illustrates a telecommunication network connected via an intermediate network to a host computer, according to certain embodiments.

FIG. 10 illustrates a telecommunication network connected via an intermediate network to a host computer in accordance with some embodiments. With reference to FIG. 10, in accordance with an embodiment, a communication system includes telecommunication network 610, such as a 3GPP-type cellular network, which comprises access network 611, such as a radio access network, and core network 614. Access network 611 comprises a plurality of base stations 612a, 612b, 612c, such as NodeBs (NBs), eNodeBs (eNBs), gNodeBs (gNBs) or other types of wireless access points, each defining a corresponding coverage area 613a, 613b, 613c. Each base station 612a, 612b, 612c is connectable to core network 614 over a wired or wireless connection 615. A first UE 691 located in coverage area 613c is configured to wirelessly connect to, or be paged by, the corresponding base station 612c. A second UE 692 in coverage area 613a is wirelessly connectable to the corresponding base station 612a. While a plurality of UEs 691, 692 are illustrated in this example, the disclosed embodiments are equally applicable to a situation where a sole UE is in the coverage area or where a sole UE is connecting to the corresponding base station 612.

Telecommunication network 610 is itself connected to host computer 630, which may be embodied in the hardware and/or software of a standalone server, a cloud-implemented server, a distributed server or as processing resources in a server farm. Host computer 630 may be under the ownership or control of a service provider, or may be operated by the service provider or on behalf of the service provider. Connections 621 and 622 between telecommunication network 610 and host computer 630 may extend directly from core network 614 to host computer 630 or may go via an optional intermediate network 620. Intermediate network 620 may be one of, or a combination of more than one of, a public, private or hosted network; intermediate network 620, if any, may be a backbone network or the Internet; in particular, intermediate network 620 may comprise two or more sub-networks (not shown).

The communication system of FIG. 10 as a whole enables connectivity between the connected UEs 691, 692 and host computer 630. The connectivity may be described as an over-the-top (OTT) connection 650. Host computer 630 and the connected UEs 691, 692 are configured to communicate data and/or signaling via OTT connection 650, using access network 611, core network 614, any intermediate network 620 and possible further infrastructure (not shown) as intermediaries. OTT connection 650 may be transparent in the sense that the participating communication devices through which OTT connection 650 passes are unaware of routing of uplink and downlink communications. For example, base station 612 may not or need not be informed about the past routing of an incoming downlink communication with data originating from host computer 630 to be forwarded (e.g., handed over) to a connected UE 691. Similarly, base station 612 need not be aware of the future routing of an outgoing uplink communication originating from the UE 691 towards the host computer 630.

Figure 11:
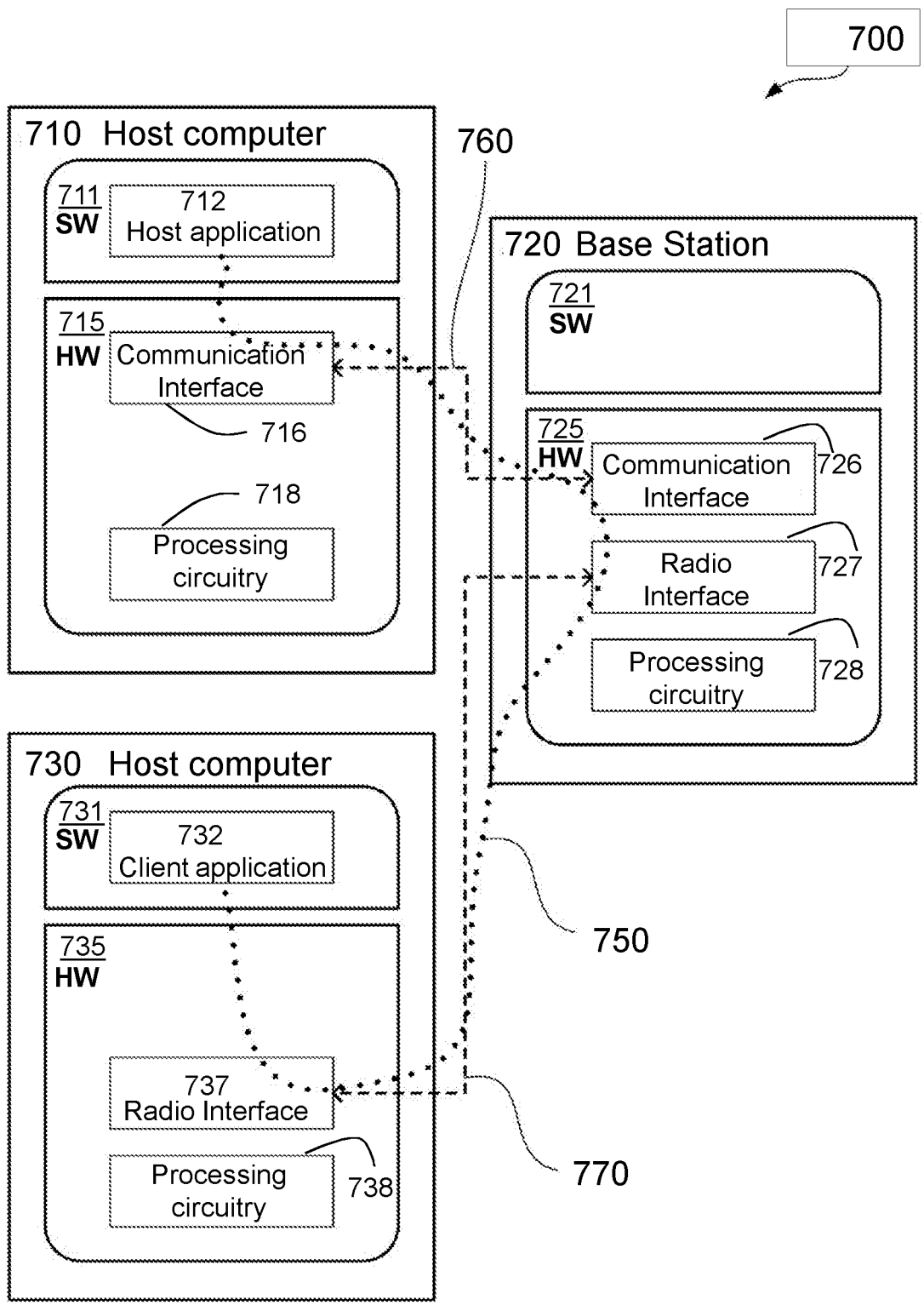
FIG. 11 illustrates a generalized block diagram of a host computer communicating via a base station with a user equipment over a partially wireless connection, according to certain embodiments.

FIG. 11 illustrates a host computer communicating via a base station with a user equipment over a partially wireless connection in accordance with some embodiments. Example implementations, in accordance with an embodiment, of the UE, base station and host computer discussed in the preceding paragraphs will now be described with reference to FIG. 11. In communication system 700, host computer 710 comprises hardware 715 including communication interface 716 configured to set up and maintain a wired or wireless connection with an interface of a different communication device of communication system 700. Host computer 710 further comprises processing circuitry 718, which may have storage and/or processing capabilities. In particular, processing circuitry 718 may comprise one or more programmable processors, application-specific integrated circuits, field programmable gate arrays or combinations of these (not shown) adapted to execute instructions. Host computer 710 further comprises software 711, which is stored in or accessible by host computer 710 and executable by processing circuitry 718. Software 711 includes host application 712. Host application 712 may be operable to provide a service to a remote user, such as UE 730 connecting via OTT connection 750 terminating at UE 730 and host computer 710. In providing the service to the remote user, host application 712 may provide user data which is transmitted using OTT connection 750.

Communication system 700 further includes base station 720 provided in a telecommunication system and comprising hardware 725 enabling it to communicate with host computer 710 and with UE 730. Hardware 725 may include communication interface 726 for setting up and maintaining a wired or wireless connection with an interface of a different communication device of communication system 700, as well as radio interface 727 for setting up and maintaining at least wireless connection 770 with UE 730 located in a coverage area (not shown in FIG. 11) served by base station 720. Communication interface 726 may be configured to facilitate connection 760 to host computer 710. Connection 760 may be direct or it may pass through a core network (not shown in FIG. 11) of the telecommunication system and/or through one or more intermediate networks outside the telecommunication system. In the embodiment shown, hardware 725 of base station 720 further includes processing circuitry 728, which may comprise one or more programmable processors, application-specific integrated circuits, field programmable gate arrays or combinations of these (not shown) adapted to execute instructions. Base station 720 further has software 721 stored internally or accessible via an external connection.

Communication system 700 further includes UE 730 already referred to. Its hardware 735 may include radio interface 737 configured to set up and maintain wireless connection 770 with a base station serving a coverage area in which UE 730 is currently located. Hardware 735 of UE 730 further includes processing circuitry 738, which may comprise one or more programmable processors, application-specific integrated circuits, field programmable gate arrays or combinations of these (not shown) adapted to execute instructions. UE 730 further comprises software 731, which is stored in or accessible by UE 730 and executable by processing circuitry 738. Software 731 includes client application 732. Client application 732 may be operable to provide a service to a human or non-human user via UE 730, with the support of host computer 710. In host computer 710, an executing host application 712 may communicate with the executing client application 732 via OTT connection 750 terminating at UE 730 and host computer 710. In providing the service to the user, client application 732 may receive request data from host application 712 and provide user data in response to the request data. OTT connection 750 may transfer both the request data and the user data. Client application 732 may interact with the user to generate the user data that it provides.

It is noted that host computer 710, base station 720 and UE 730 illustrated in FIG. 11 may be similar or identical to host computer 630, one of base stations 612a, 612b, 612c and one of UEs 691, 692 of FIG. 10, respectively. This is to say, the inner workings of these entities may be as shown in FIG. 11 and independently, the surrounding network topology may be that of FIG. 10.

In FIG. 11, OTT connection 750 has been drawn abstractly to illustrate the communication between host computer 710 and UE 730 via base station 720, without explicit reference to any intermediary devices and the precise routing of messages via these devices. Network infrastructure may determine the routing, which it may be configured to hide from UE 730 or from the service provider operating host computer 710, or both. While OTT connection 750 is active, the network infrastructure may further take decisions by which it dynamically changes the routing (e.g., on the basis of load balancing consideration or reconfiguration of the network).

Wireless connection 770 between UE 730 and base station 720 is in accordance with the teachings of the embodiments described throughout this disclosure. One or more of the various embodiments improve the performance of OTT services provided to UE 730 using OTT connection 750, in which wireless connection 770 forms the last segment.

A measurement procedure may be provided for the purpose of monitoring data rate, latency and other factors on which the one or more embodiments improve. There may further be an optional network functionality for reconfiguring OTT connection 750 between host computer 710 and UE 730, in response to variations in the measurement results. The measurement procedure and/or the network functionality for reconfiguring OTT connection 750 may be implemented in software 711 and hardware 715 of host computer 710 or in software 731 and hardware 735 of UE 730, or both. In embodiments, sensors (not shown) may be deployed in or in association with communication devices through which OTT connection 750 passes; the sensors may participate in the measurement procedure by supplying values of the monitored quantities exemplified above, or supplying values of other physical quantities from which software 711, 731 may compute or estimate the monitored quantities. The reconfiguring of OTT connection 750 may include message format, retransmission settings, preferred routing etc.; the reconfiguring need not affect base station 720, and it may be unknown or imperceptible to base station 720. Such procedures and functionalities may be known and practiced in the art. In certain embodiments, measurements may involve proprietary UE signaling facilitating host computer 710's measurements of throughput, propagation times, latency and the like. The measurements may be implemented in that software 711 and 731 causes messages to be transmitted, in particular empty or 'dummy' messages, using OTT connection 750 while it monitors propagation times, errors etc.

Figures 12, 13:
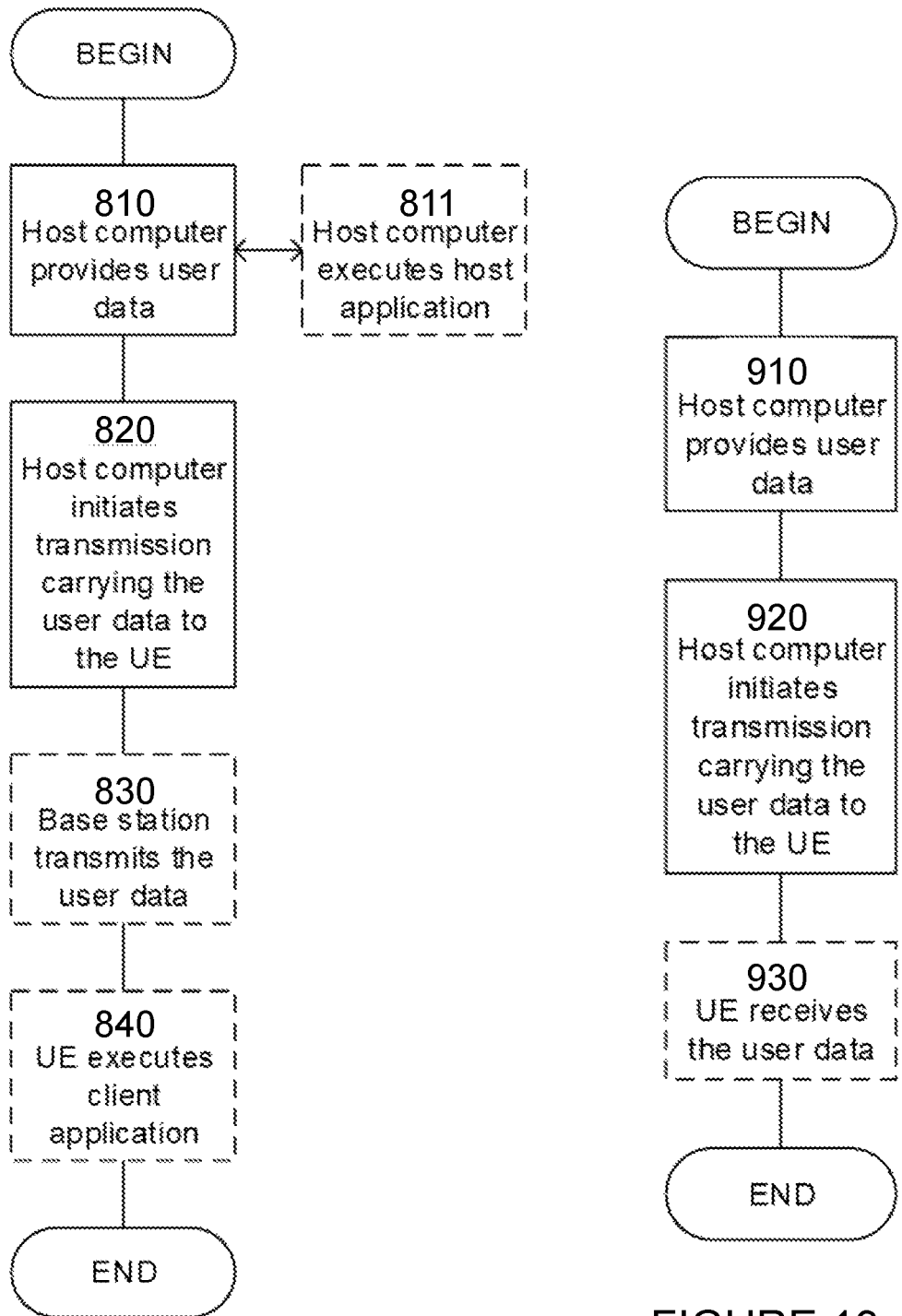
FIG. 12 illustrates a method implemented in a communication system, according to one embodiment.
FIG. 13 illustrates another method implemented in a communication system, according to one embodiment.

FIG. 12 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 12 will be included in this section. In step 810, the host computer provides user data. In substep 811 (which may be optional) of step 810, the host computer provides the user data by executing a host application. In step 820, the host computer initiates a transmission carrying the user data to the UE. In step 830 (which may be optional), the base station transmits to the UE the user data which was carried in the transmission that the host computer initiated, in accordance with the teachings of the embodiments described throughout this disclosure. In step 840 (which may also be optional), the UE executes a client application associated with the host application executed by the host computer.

FIG. 13 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 13 will be included in this section. In step 910 of the method, the host computer provides user data. In an optional substep (not shown) the host computer provides the user data by executing a host application. In step 920, the host computer initiates a transmission carrying the user data to the UE. The transmission may pass via the base station, in accordance with the teachings of the embodiments described throughout this disclosure. In step 930 (which may be optional), the UE receives the user data carried in the transmission.

Figures 14, 15:
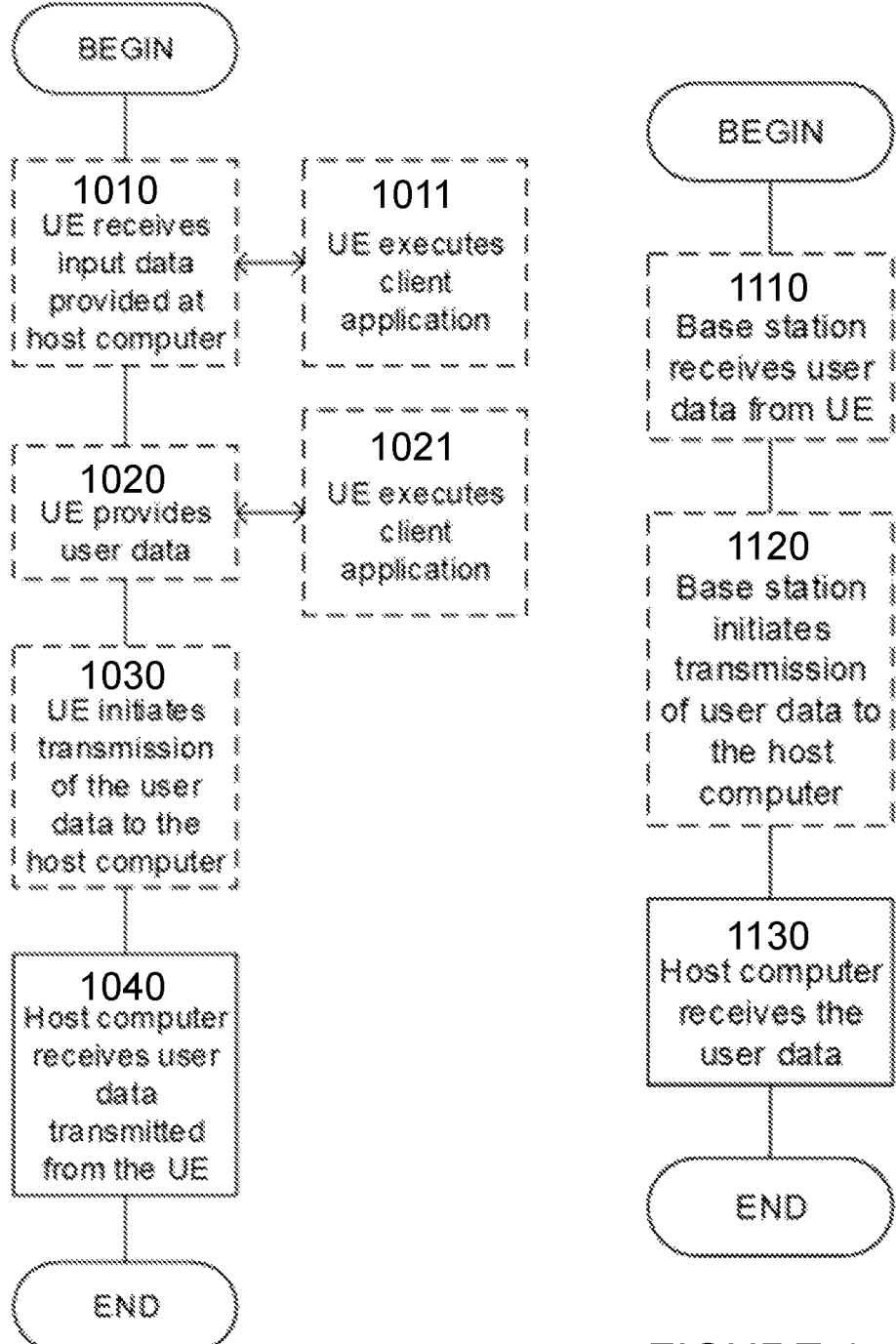
FIG. 14 illustrates another method implemented in a communication system, according to one embodiment.
FIG. 15 illustrates another method implemented in a communication system, according to one embodiment.

FIG. 14 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 14 will be included in this section. In step 1010 (which may be optional), the UE receives input data provided by the host computer. Additionally or alternatively, in step 1020, the UE provides user data. In substep 1021 (which may be optional) of step 1020, the UE provides the user data by executing a client application. In substep 1011 (which may be optional) of step 1010, the UE executes a client application which provides the user data in reaction to the received input data provided by the host computer. In providing the user data, the executed client application may further consider user input received from the user. Regardless of the specific manner in which the user data was provided, the UE initiates, in sub step 1030 (which may be optional), transmission of the user data to the host computer. In step 1040 of the method, the host computer receives the user data transmitted from the UE, in accordance with the teachings of the embodiments described throughout this disclosure.

FIG. 15 is a flowchart illustrating a method implemented in a communication system, in accordance with one embodiment. The communication system includes a host computer, a base station and a UE which may be those described with reference to FIGS. 10 and 11. For simplicity of the present disclosure, only drawing references to FIG. 15 will be included in this section. In step 1110 (which may be optional), in accordance with the teachings of the embodiments described throughout this disclosure, the base station receives user data from the UE. In step 1120 (which may be optional), the base station initiates transmission of the received user data to the host computer. In step 1130 (which may be optional), the host computer receives the user data carried in the transmission initiated by the base station.

Figure 16:
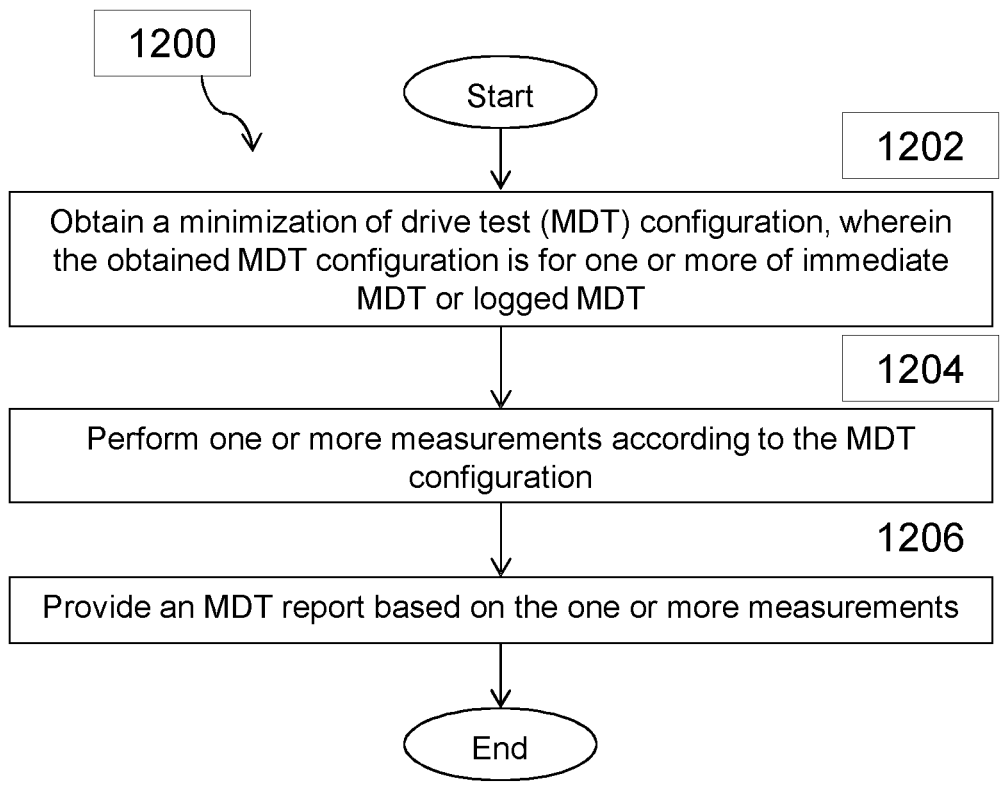
FIG. 16 illustrates an example method by a wireless device, according to certain embodiments.

FIG. 16 is a flow chart of a method 1200 in a wireless device (e.g., a UE), in accordance with certain embodiments. The method begins at step 1202, where the wireless device obtains an MDT configuration, wherein the obtained MDT configuration is for one or more of immediate MDT and logged MDT. In certain embodiments, the MDT configuration may be obtained from a RAN node.

In certain embodiments, the obtained MDT configuration may comprise one or more of: one or more A2 event specific configuration enhancements; and one or more periodic event specific configuration enhancements. In certain embodiments, the obtained MDT configuration may comprise one or more of the following: a reportOnLeave configuration; a report QuantityRS-Indexes configuration; a maxNrofRS-IndexesToReport configuration: and an rsType configuration. In certain embodiments, the obtained MDT configuration may comprise an indication of whether or not location information is requested by OAM.

At step 1204, the wireless device performs one or more measurements according to the MDT configuration.

At step 1206, the wireless device provides an MDT report based on the one or more measurements. In certain embodiments, the MDT report may be provided to the RAN node.

In certain embodiments, the method may further comprise obtaining positioning assistance data. In certain embodiments, the positioning assistance data may be obtained from the RAN node. In certain embodiments, the positioning assistance data may be obtained together with the MDT configuration. In certain embodiments, the positioning assistance data may be obtained from a location server. In certain embodiments, the method may comprise retrieving positioning information based on the positioning assistance data and including the positioning information in the provided MDT report.

In certain embodiments, the obtained MDT configuration may configure the wireless device to include a best beam index of a New Radio (NR) camped cell in the MDT report.

In certain embodiments, the obtained MDT configuration may configure the wireless device to include a best beam index of an NR camped cell and one or more neighboring NR cells in the MDT report.

In certain embodiments, the obtained MDT configuration may configure the wireless device to include a best beam index of an NR camped cell and at least one beam level measurement quantity of the NR camped cell in the MDT report.

In certain embodiments, the obtained MDT configuration may configure the wireless device to include a best beam index and at least one beam level measurement quantity of an NR camped cell and one or more neighboring NR cells in the MDT report.

In certain embodiments, the obtained MDT configuration may configure the wireless device to include up to a pre-defined number of strongest beam indices and at least one respective beam level measurement quantity for an NR camped cell in the MDT report.

In certain embodiments, the obtained MDT configuration may configure the wireless device to include up to a pre-defined number of strongest beam indices and at least one respective beam level measurement quantity for an NR camped cell and one or more neighboring NR cells in the MDT report.

In certain embodiments, the method may further comprise providing user data and forwarding the user data to a host computer via the transmission to the base station.

Figure 17:
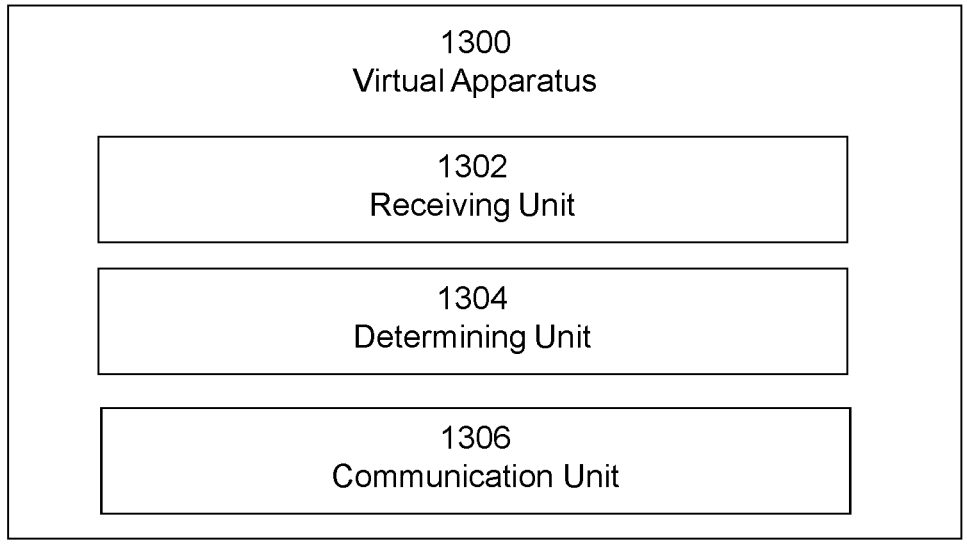
FIG. 17 illustrates an exemplary virtual computing device, according to certain embodiments.

FIG. 17 illustrates a schematic block diagram of an apparatus 1300 in a wireless network (for example, the wireless network shown in FIG. 5). The apparatus may be implemented in a wireless device (e.g., wireless device 110 shown in FIG. 5). Apparatus 1300 is operable to carry out the example method described with reference to FIG. 16 and possibly any other processes or methods disclosed herein. It is also to be understood that the method of FIG. 16 is not necessarily carried out solely by apparatus 1300. At least some operations of the method can be performed by one or more other entities.

Virtual Apparatus 1300 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1302, determining unit 1304, communication unit 1306, and any other suitable units of apparatus 1300 to perform corresponding functions according one or more embodiments of the present disclosure.

In certain embodiments, apparatus 1300 may be a UE. As illustrated in FIG. 17, apparatus 1300 includes receiving unit 1302, determining unit 1304, and communication unit 1306. Receiving unit 1302 may be configured to perform the receiving functions of apparatus 1300. For example, receiving unit 1302 may be configured to obtain an MDT configuration (e.g., from a network node such as a RAN node). As another example, receiving unit 1302 may be configured to obtain positioning assistance data (e.g., from a RAN node and/or a location server).

Receiving unit 1302 may receive any suitable information (e.g., from a wireless device or another network node). Receiving unit 1302 may include a receiver and/or a transceiver, such as RF transceiver circuitry 122 described above in relation to FIG. 3. Receiving unit 1302 may include circuitry configured to receive messages and/or signals (wireless or wired). In particular embodiments, receiving unit 1302 may communicate received messages and/or signals to determining unit 1304 and/or any other suitable unit of apparatus 1300. The functions of receiving unit 1302 may, in certain embodiments, be performed in one or more distinct units.

Determining unit 1304 may perform the processing functions of apparatus 1300. For example, determining unit 1304 may be configured to perform one or more measurements according to the MDT configuration. As another example, determining unit 1304 may be configured to generate an MDT report based on the one or more measurements. As still another example, determining unit 1304 may be configured to retrieve positioning information based on the positioning assistance data and include the positioning information in the MDT report. As yet another example, determining unit 1304 may be configured to provide user data.

Determining unit 1304 may include or be included in one or more processors, such as processing circuitry 320 described above in relation to FIG. 5. Determining unit 1304 may include analog and/or digital circuitry configured to perform any of the functions of determining unit 1304 and/or processing circuitry 320 described above. The functions of determining unit 1304 may, in certain embodiments, be performed in one or more distinct units.

Communication unit 1306 may be configured to perform the transmission functions of apparatus 1300. For example, communication unit 1306 may be configured to provide an MDT report based on the one or more measurements (e.g., to a RAN node). As another example, communication unit 1306 may be configured to forward the user data to a host computer via a transmission to a network node (e.g., a base station).

Communication unit 1306 may transmit messages (e.g., to a wireless device and/or another network node). Communication unit 1306 may include a transmitter and/or a transceiver, such as RF transceiver circuitry 322 described above in relation to FIG. 5. Communication unit 1306 may include circuitry configured to transmit messages and/or signals (e.g., through wireless or wired means). In particular embodiments, communication unit 1306 may receive messages and/or signals for transmission from determining unit 1304 or any other unit of apparatus 1300. The functions of communication unit 1304 may, in certain embodiments, be performed in one or more distinct units.

As used herein the term unit may have conventional meaning in the field of electronics, electrical devices and/or electronic devices and may include, for example, electrical and/or electronic circuitry, devices, modules, processors, memories, logic solid state and/or discrete devices, computer programs or instructions for carrying out respective tasks, procedures, computations, outputs, and/or displaying functions, and so on, as such as those that are described herein.

In some embodiments a computer program, computer program product or computer readable storage medium comprises instructions which when executed on a computer perform any of the embodiments disclosed herein. In further examples the instructions are carried on a signal or carrier and which are executable on a computer wherein when executed perform any of the embodiments disclosed herein.

Figure 18:
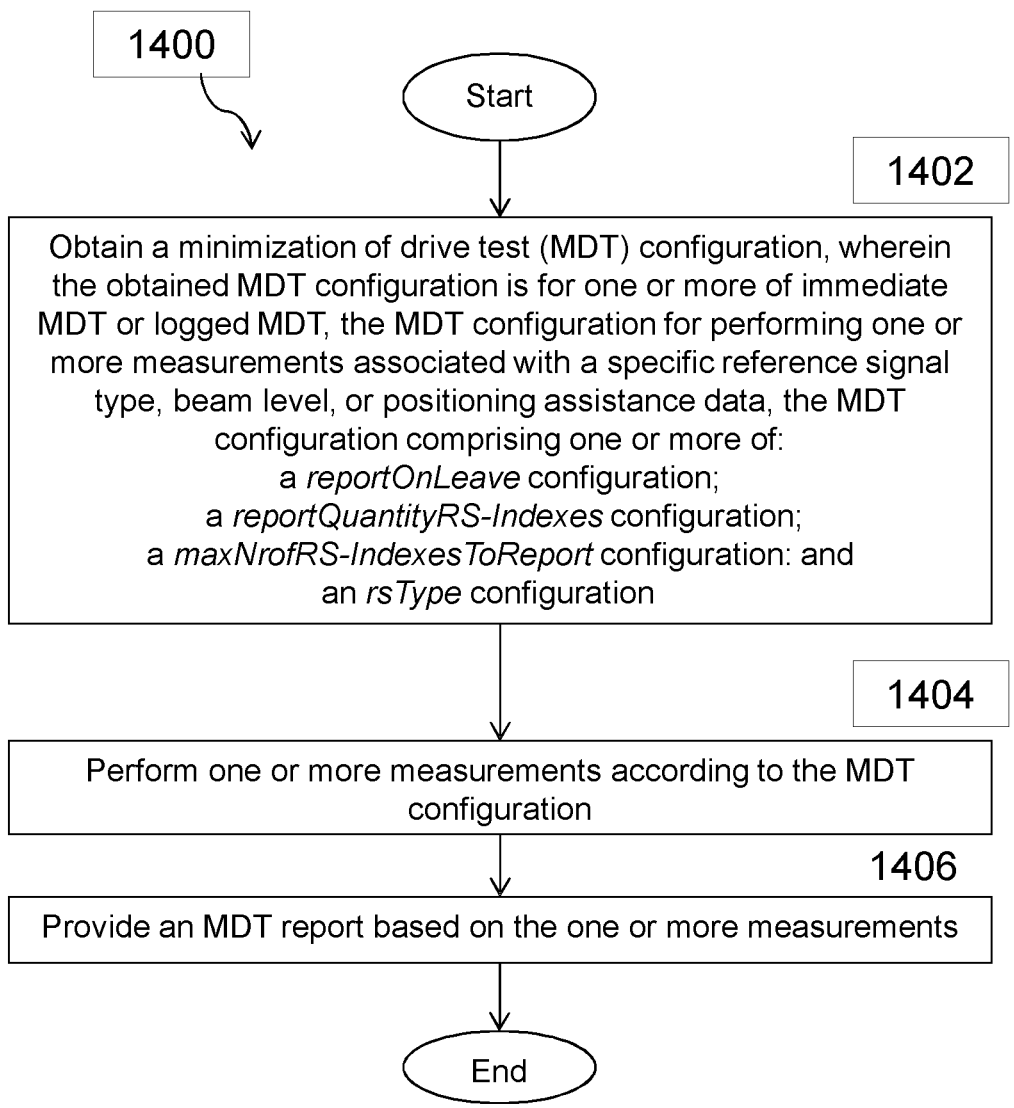
FIG. 18 illustrates another example method by a wireless device, according to certain embodiments.

FIG. 18 illustrates another method 1400 performed by a wireless device 310 (e.g., a UE) for configured MDT reporting, in accordance with certain embodiments. The method begins at step 1402 when wireless device 310 obtains a MDT configuration. The obtained MDT configuration is for one or more of immediate MDT and logged MDT and is for performing one or more measurements associated with a specific reference signal type, beam level, or positioning assistance data. The obtained MDT configuration comprising one or more of: a reportOnLeave configuration; a reportQuantityRS-Indexes configuration; a maxNrofRS-IndexesToReport configuration: and an rsType configuration. At step 1404, the wireless device 310 performs the one or more measurements according to the MDT configuration. At step 1406, the wireless device 310 provides an MDT report based on the one or more measurements.

In a particular embodiment, when obtaining the MDT configuration, the wireless device 310 receives the MDT configuration from a RAN node.

In a particular embodiment, when providing the MDT report, the wireless device 310 transmits the MDT report to the RAN node.

In a particular embodiment, the obtained MDT configuration includes one or more of: one or more A2 event specific configuration enhancements; and one or more periodic event specific configuration enhancements.

In a particular embodiment, the obtained MDT configuration includes an indication of whether or not location information is requested by OAM.

In a particular embodiment, the obtained MDT configuration configures the wireless device 310 to include beam level information the MDT report.

In a particular embodiment, the obtained MDT configuration configures the wireless device 310 to include a best beam index of at least one of a NR camped cell and one or more neighboring NR cells in the MDT report.

In a particular embodiment, the obtained MDT configuration configures the wireless device 310 to include a best beam index of an NR camped cell and at least one beam level measurement quantity of the NR camped cell in the MDT report.

In a particular embodiment, the obtained MDT configuration configures the wireless device 310 to include a best beam index and at least one beam level measurement quantity of an NR camped cell and one or more neighboring NR cells in the MDT report.

In a particular embodiment, the obtained MDT configuration configures the wireless device 310 to include at least one respective beam level measurement quantity for an NR camped cell in the MDT report, and the MDT report includes up to a predefined number of strongest beam indices.

In a particular embodiment, the obtained MDT configuration configures the wireless device 310 to include at least one respective beam level measurement quantity for an NR camped cell and one or more neighboring NR cells in the MDT report, and the MDT report includes up to a predefined number of strongest beam indices.

In a particular embodiment, the wireless device 310 may obtain positioning assistance data from at least one of a RAN node and a location server. In a further particular embodiment, the positioning assistance data is obtained together with the MDT configuration.

In a particular embodiment, the wireless device 310 retrieves positioning information based on the positioning assistance data and includes the positioning information in the provided MDT report.

Figure 19:
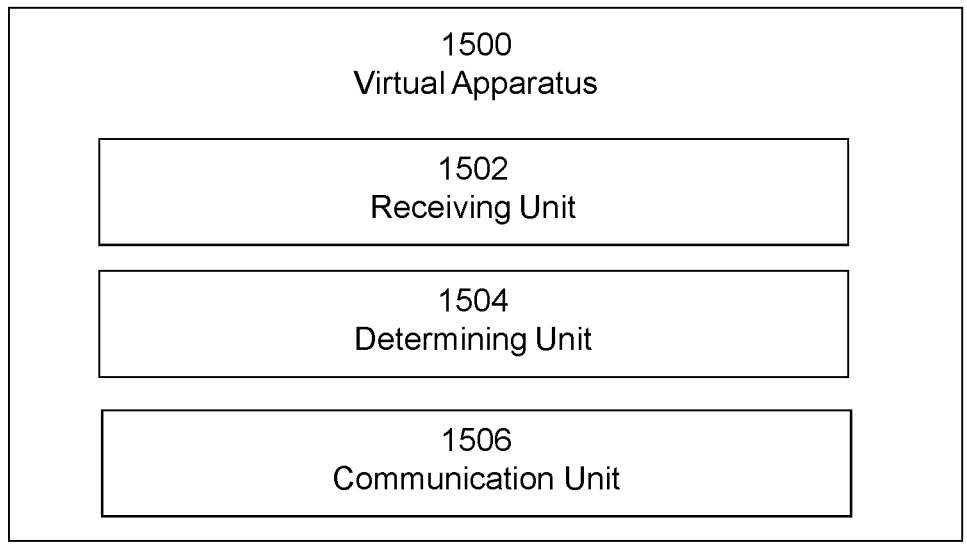
FIG. 19 illustrates another exemplary virtual computing device, according to certain embodiments.

FIG. 19 illustrates a schematic block diagram of an apparatus 1500 in a wireless network (for example, the wireless network shown in FIG. 5). The apparatus may be implemented in a wireless device (e.g., wireless device 110 shown in FIG. 5). Apparatus 1500 is operable to carry out the example method described with reference to FIG. 18 and possibly any other processes or methods disclosed herein. It is also to be understood that the method of FIG. 18 is not necessarily carried out solely by apparatus 1500. At least some operations of the method can be performed by one or more other entities.

Virtual Apparatus 1500 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1502, determining unit 1504, communication unit 1506, and any other suitable units of apparatus 1500 to perform corresponding functions according one or more embodiments of the present disclosure.

In certain embodiments, apparatus 1500 may be a UE. As illustrated in FIG. 19, apparatus 1500 includes receiving unit 1502, determining unit 1504, and communication unit 1506. Receiving unit 1502 may be configured to perform the receiving functions of apparatus 1500. For example, receiving unit 1502 may be configured to obtain a MDT configuration (e.g., from a network node such as a RAN node). According to certain embodiments, the obtained MDT configuration is for one or more of immediate MDT and logged MDT and is for performing one or more measurements associated with a specific reference signal type, beam level, or positioning assistance data. According to certain embodiments, the obtained MDT configuration comprising one or more of: a reportOnLeave configuration; a reportQuantityRS-Indexes configuration; a maxNrofRS-IndexesToReport configuration: and an rsType configuration. As another example, receiving unit 1502 may be configured to obtain positioning assistance data (e.g., from a RAN node and/or a location server).

Receiving unit 1502 may receive any suitable information (e.g., from a wireless device or another network node). Receiving unit 1502 may include a receiver and/or a transceiver, such as RF transceiver circuitry 322 described above in relation to FIG. 5. Receiving unit 1502 may include circuitry configured to receive messages and/or signals (wireless or wired). In particular embodiments, receiving unit 1502 may communicate received messages and/or signals to determining unit 1504 and/or any other suitable unit of apparatus 1500. The functions of receiving unit 1302 may, in certain embodiments, be performed in one or more distinct units.

Determining unit 1504 may perform the processing functions of apparatus 1500. For example, determining unit 1504 may be configured to perform the one or more measurements according to the MDT configuration. As another example, determining unit 1504 may be configured to generate an MDT report based on the one or more measurements. As still another example, determining unit 1504 may be configured to retrieve positioning information based on the positioning assistance data and include the positioning information in the MDT report. As yet another example, determining unit 1504 may be configured to provide user data.

Determining unit 1504 may include or be included in one or more processors, such as processing circuitry 320 described above in relation to FIG. 5. Determining unit 1504 may include analog and/or digital circuitry configured to perform any of the functions of determining unit 1504 and/or processing circuitry 320 described above. The functions of determining unit 1504 may, in certain embodiments, be performed in one or more distinct units.

Communication unit 1506 may be configured to perform the transmission functions of apparatus 1500. For example, communication unit 1506 may be configured to provide an MDT report based on the one or more measurements (e.g., to a RAN node). As another example, communication unit 1506 may be configured to forward the user data to a host computer via a transmission to a network node (e.g., a base station).

Communication unit 1506 may transmit messages (e.g., to a wireless device and/or another network node). Communication unit 1506 may include a transmitter and/or a transceiver, such as RF transceiver circuitry 322 described above in relation to FIG. 5. Communication unit 1306 may include circuitry configured to transmit messages and/or signals (e.g., through wireless or wired means). In particular embodiments, communication unit 1506 may receive messages and/or signals for transmission from determining unit 1504 or any other unit of apparatus 1500. The functions of communication unit 1504 may, in certain embodiments, be performed in one or more distinct units.

Figure 20:
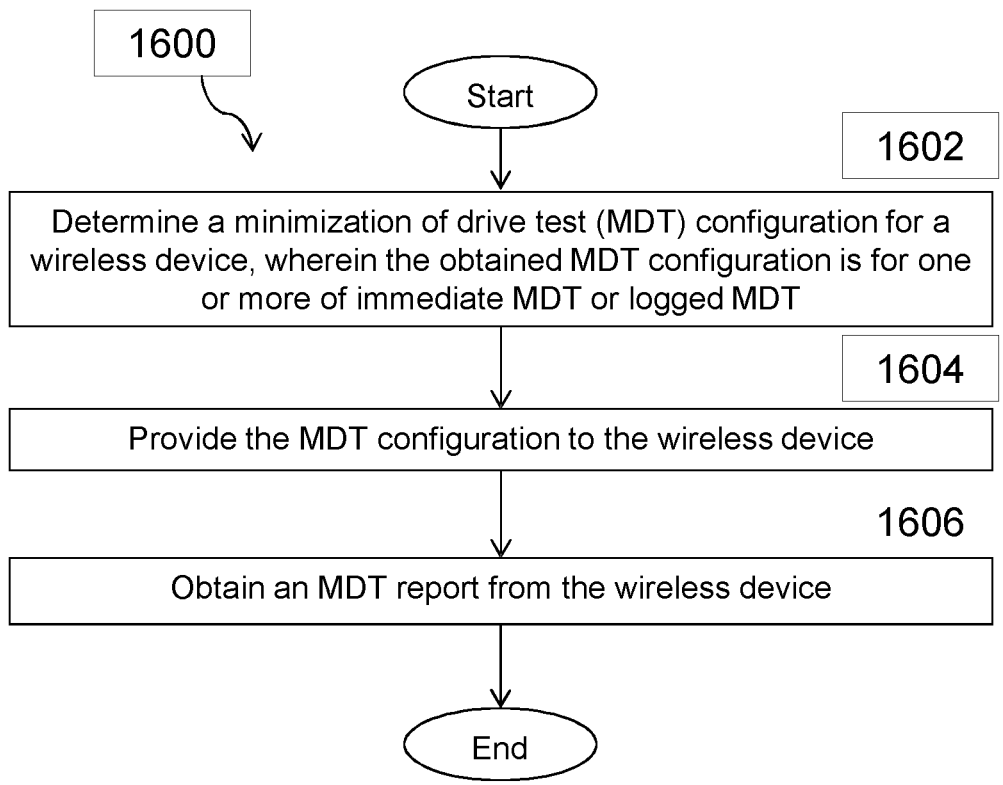
FIG. 20 illustrates an example method by a network node, according to certain embodiments.

FIG. 20 is a flow chart of a method 1600 in a network node, in accordance with certain embodiments. The method begins at step 1602, where the network node determines a minimization of drive test (MDT) configuration for a wireless device, wherein the MDT configuration is for one or more of immediate MDT and logged MDT. In certain embodiments, the network node may be a RAN node. In certain embodiments, the MDT configuration may be determined in cooperation with OAM.

At step 1604, the network node provides the MDT configuration to the wireless device.

At step 1606, the network node obtains an MDT report from the wireless device. In certain embodiments, the method may further comprise providing the MDT report to OAM.

In certain embodiments, the method may comprise obtaining positioning assistance data and configuring the wireless device with the positioning assistance data. In certain embodiments, the positioning assistance data may be obtained from a location server. In certain embodiments, configuring the wireless device with the positioning assistance data may comprise providing the positioning assistance data together with the MDT configuration. In certain embodiments, the method may further comprise obtaining positioning information from the wireless device, the positioning information based on the positioning assistance data. In certain embodiments, the positioning information may be included in the obtained MDT report.

In certain embodiments, the MDT configuration may comprise one or more of: one or more A2 event specific configuration enhancements; and one or more periodic event specific configuration enhancements.

In certain embodiments, the MDT configuration may comprise one or more of the following: a reportOnLeave configuration; a reportQuantityRS-Indexes configuration; a maxNrofRS-IndexesToReport configuration: and an rsType configuration.

In certain embodiments, the MDT configuration may comprise an indication of whether or not location information is requested by OAM.

In certain embodiments, the MDT configuration may configure the wireless device to include a best beam index of a New Radio (NR) camped cell in the MDT report.

In certain embodiments, the MDT configuration may configure the wireless device to include a best beam index of an NR camped cell and one or more neighboring NR cells in the MDT report.

In certain embodiments, the MDT configuration may configure the wireless device to include a best beam index of an NR camped cell and at least one beam level measurement quantity of the NR camped cell in the MDT report.

In certain embodiments, the MDT configuration may configure the wireless device to include a best beam index and at least one beam level measurement quantity of an NR camped cell and one or more neighboring NR cells in the MDT report.

In certain embodiments, the MDT configuration may configure the wireless device to include up to a predefined number of strongest beam indices and at least one respective beam level measurement quantity for an NR camped cell in the MDT report.

In certain embodiments, the MDT configuration may configure the wireless device to include up to a predefined number of strongest beam indices and at least one respective beam level measurement quantity for an NR camped cell and one or more neighboring NR cells in the MDT report.

In certain embodiments, the method may further comprise obtaining user data and forwarding the user data to a host computer or a wireless device.

Figure 21:
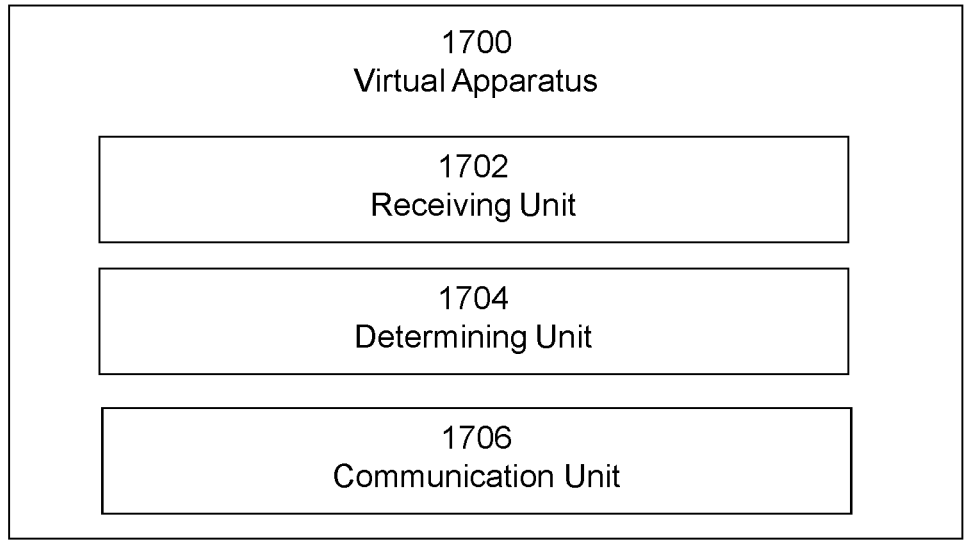
FIG. 21 illustrates another exemplary virtual computing device, according to certain embodiments.

FIG. 21 illustrates a schematic block diagram of an apparatus 1700 in a wireless network (for example, the wireless network shown in FIG. 5. The apparatus may be implemented in a network node (e.g., network node 360 shown in FIG. 5). Apparatus 1700 is operable to carry out the example method described with reference to FIG. 20 and possibly any other processes or methods disclosed herein. It is also to be understood that the method of FIG. 20 is not necessarily carried out solely by apparatus 1700. At least some operations of the method can be performed by one or more other entities.

Virtual Apparatus 1700 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1702, determining unit 1704, communication unit 1706, and any other suitable units of apparatus 1700 to perform corresponding functions according one or more embodiments of the present disclosure.

In certain embodiments, apparatus 1700 may be an eNB or a gNB. As illustrated in FIG. 21, apparatus 1700 includes receiving unit 1702, determining unit 1704, and communication unit 1706. Receiving unit 1702 may be configured to perform the receiving functions of apparatus 1700. For example, receiving unit 1702 may be configured to obtain an MDT report from the wireless device. As another example, receiving unit 1702 may be configured to obtain positioning assistance data (e.g., from a location server). As still another example, receiving unit 1702 may be configured to obtain positioning information from the wireless device. As yet another example, receiving unit 1702 may be configured to obtain user data.

Receiving unit 1702 may receive any suitable information (e.g., from a wireless device or another network node). Receiving unit 1702 may include a receiver and/or a transceiver, such as RF transceiver circuitry 372 described above in relation to FIG. 5. Receiving unit 1702 may include circuitry configured to receive messages and/or signals (wireless or wired). In particular embodiments, receiving unit 1702 may communicate received messages and/or signals to determining unit 1704 and/or any other suitable unit of apparatus 1700. The functions of receiving unit 1702 may, in certain embodiments, be performed in one or more distinct units.

Determining unit 1704 may perform the processing functions of apparatus 1700. For example, determining unit 1704 may be configured to determine an MDT configuration for a wireless device, wherein the MDT configuration is for one or more of immediate MDT and logged MDT. In certain embodiments, determining unit 1704 may be configured to determine the MDT configuration in cooperation with OAM. As another example, determining unit 1704 may be configured to configure the wireless device with the positioning assistance data.

Determining unit 1704 may include or be included in one or more processors, such as processing circuitry 370 described above in relation to FIG. 5. Determining unit 1704 may include analog and/or digital circuitry configured to perform any of the functions of determining unit 1704 and/or processing circuitry 370 described above. The functions of determining unit 1704 may, in certain embodiments, be performed in one or more distinct units.

Communication unit 1706 may be configured to perform the transmission functions of apparatus 1700. For example, communication unit 1706 may be configured to provide the MDT configuration to the wireless device. As another example, communication unit 1706 may be configured to provide the MDT report to OAM. As still another example, communication unit 1706 may be configured to provide the positioning assistance data together with the MDT configuration. As yet another example, communication unit 1706 may be configured to forward the user data to a host computer or the wireless device.

Communication unit 1706 may transmit messages (e.g., to a wireless device and/or another network node). Communication unit 1706 may include a transmitter and/or a transceiver, such as RF transceiver circuitry 372 described above in relation to FIG. 5. Communication unit 1706 may include circuitry configured to transmit messages and/or signals (e.g., through wireless or wired means). In particular embodiments, communication unit 1706 may receive messages and/or signals for transmission from determining unit 1704 or any other unit of apparatus 1700. The functions of communication unit 1704 may, in certain embodiments, be performed in one or more distinct units.

Figure 22:
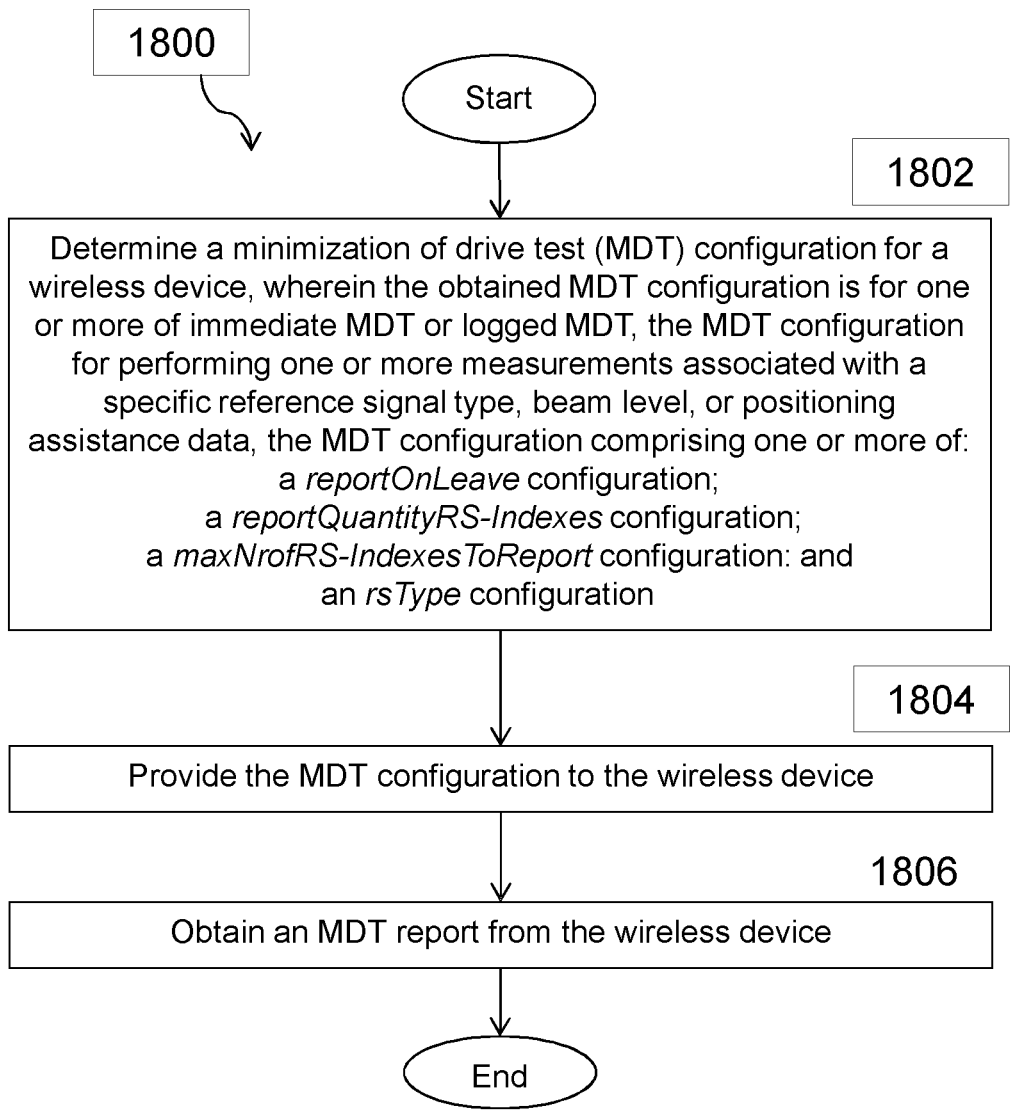
FIG. 22 illustrates an example method by a network node, according to certain embodiments.

FIG. 22 illustrates another method 1800 performed by a network node 360 for configured MDT, in accordance with certain embodiments. The method begins at step 1802, where the network node 360 determines a MDT configuration for a wireless device 310. The MDT configuration is for one or more of immediate MDT and logged MDT. According to certain embodiments, the MDT configuration is for performing one or more measurements associated with a specific reference signal type, beam level, or positioning assistance data, and the MDT configuration comprising one or more of the following: a reportOnLeave configuration; a report QuantityRS-Indexes configuration; a maxNrofRS-IndexesToReport configuration: and an rsType configuration. At step 1804, the network node 360 provides the MDT configuration to the wireless device. At step 1806, the network node 360 obtains an MDT report from the wireless device.

In a particular embodiment, the network node 360 is a RAN node.

In a particular embodiment, the MDT configuration is determined in cooperation with OAM, and the network node 360 determines the MDT report to OAM.

In a particular embodiment, the MDT configuration includes one or more of: one or more A2 event specific configuration enhancements and one or more periodic event specific configuration enhancements.

In a particular embodiment, the MDT configuration includes an indication of whether or not location information is requested by OAM.

In a particular embodiment, the MDT configuration configures the wireless device 310 to include beam level information in the MDT report.

In a particular embodiment, the MDT configuration configures the wireless device 310 to include a best beam index of at least one of a NR camped cell and one or more neighboring NR cells in the MDT report.

In a particular embodiment, the MDT configuration configures the wireless device 310 to include a best beam index of an NR camped cell and at least one beam level measurement quantity of the NR camped cell in the MDT report.

In a particular embodiment, the MDT configuration configures the wireless device 310 to include a best beam index and at least one beam level measurement quantity of an NR camped cell and one or more neighboring NR cells in the MDT report.

In a particular embodiment, the MDT configuration configures the wireless device 310 to include at least one respective beam level measurement quantity for an NR camped cell in the MDT report, and the MDT report includes up to a predefined number of strongest beam indices.

In a particular embodiment, the MDT configuration configures the wireless device 310 to include at least one respective beam level measurement quantity for an NR camped cell and one or more neighboring NR cells in the MDT report, and the MDT report includes up to a predefined number of strongest beam indices.

In a particular embodiment, the network node 360 obtains positioning assistance data from a location server and configures the wireless device 310 with the positioning assistance data.

In a particular embodiment, configuring the wireless device 310 with the positioning assistance data includes providing the positioning assistance data together with the MDT configuration.

In a particular embodiment, the network node 360 obtains positioning information from the wireless device 310, and the positioning information based on the positioning assistance data. In a further particular embodiment, the positioning information is included in the obtained MDT report.

Figure 23:
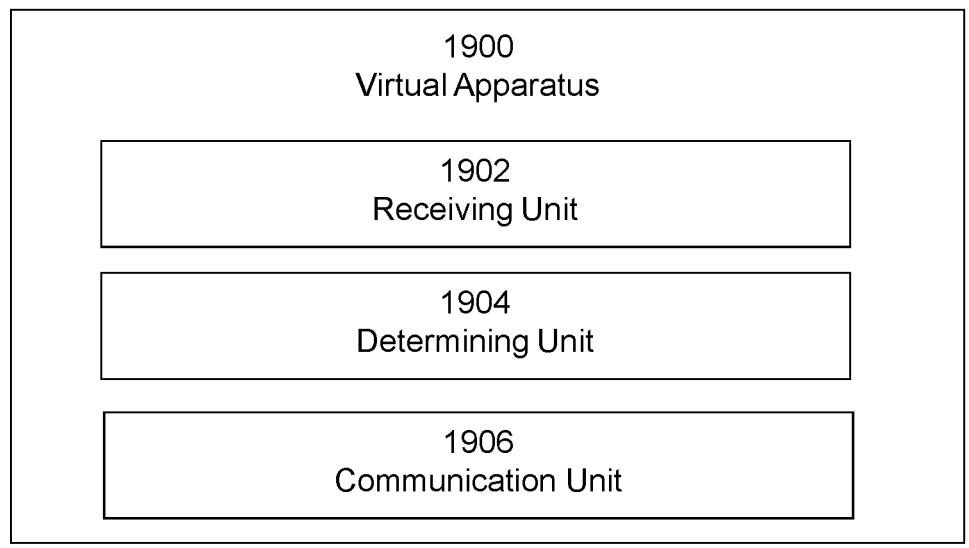
FIG. 23 illustrates another exemplary virtual computing device, according to certain embodiments.

FIG. 23 illustrates a schematic block diagram of an apparatus 1900 in a wireless network (for example, the wireless network shown in FIG. 5. The apparatus may be implemented in a network node (e.g., network node 360 shown in FIG. 5). Apparatus 1900 is operable to carry out the example method described with reference to FIG. 22 and possibly any other processes or methods disclosed herein. It is also to be understood that the method of FIG. 22 is not necessarily carried out solely by apparatus 1900. At least some operations of the method can be performed by one or more other entities.

Virtual Apparatus 1900 may comprise processing circuitry, which may include one or more microprocessor or microcontrollers, as well as other digital hardware, which may include digital signal processors (DSPs), special-purpose digital logic, and the like. The processing circuitry may be configured to execute program code stored in memory, which may include one or several types of memory such as read-only memory (ROM), random-access memory, cache memory, flash memory devices, optical storage devices, etc. Program code stored in memory includes program instructions for executing one or more telecommunications and/or data communications protocols as well as instructions for carrying out one or more of the techniques described herein, in several embodiments. In some implementations, the processing circuitry may be used to cause receiving unit 1902, determining unit 1904, communication unit 1906, and any other suitable units of apparatus 1900 to perform corresponding functions according one or more embodiments of the present disclosure.

In certain embodiments, apparatus 1900 may be an eNB or a gNB. As illustrated in FIG. 23, apparatus 1900 includes receiving unit 1902, determining unit 1904, and communication unit 1906. Receiving unit 1902 may be configured to perform the receiving functions of apparatus 1900. For example, receiving unit 1902 may be configured to obtain or determine a MDT configuration for a wireless device 310. According to certain embodiments, the MDT configuration is for one or more of immediate MDT and logged MDT. According to certain embodiments, the MDT configuration is for performing one or more measurements associated with a specific reference signal type, beam level, or positioning assistance data, and the MDT configuration includes one or more of the following: a reportOnLeave configuration; a reportQuantityRS-Indexes configuration; a maxNrofRS-IndexesToReport configuration: and an rsType configuration. As another example, receiving unit 1902 may be configured to obtain positioning assistance data (e.g., from a location server). As still another example, receiving unit 1902 may be configured to obtain positioning information from the wireless device. As yet another example, receiving unit 1902 may be configured to obtain user data.

Receiving unit 1902 may receive any suitable information (e.g., from a wireless device or another network node). Receiving unit 1902 may include a receiver and/or a transceiver, such as RF transceiver circuitry 372 described above in relation to FIG. 5. Receiving unit 1902 may include circuitry configured to receive messages and/or signals (wireless or wired). In particular embodiments, receiving unit 1902 may communicate received messages and/or signals to determining unit 1904 and/or any other suitable unit of apparatus 1900. The functions of receiving unit 1902 may, in certain embodiments, be performed in one or more distinct units.

Determining unit 1904 may perform the processing functions of apparatus 1900. For example, determining unit 1904 may be configured to determine an MDT configuration for a wireless device, wherein the MDT configuration is for one or more of immediate MDT and logged MDT. In certain embodiments, determining unit 1904 may be configured to determine the MDT configuration in cooperation with OAM. As another example, determining unit 1904 may be configured to configure the wireless device with the positioning assistance data.

Determining unit 1904 may include or be included in one or more processors, such as processing circuitry 370 described above in relation to FIG. 5. Determining unit 1904 may include analog and/or digital circuitry configured to perform any of the functions of determining unit 1904 and/or processing circuitry 370 described above. The functions of determining unit 1904 may, in certain embodiments, be performed in one or more distinct units.

Communication unit 1906 may be configured to perform the transmission functions of apparatus 1900. For example, communication unit 1906 may be configured to provides the MDT configuration to the wireless device 310. As another example, communication unit 1906 may be configured to obtain an MDT report from the wireless device and, in a particular embodiment, provide the MDT report to OAM. As still another example, communication unit 1906 may be configured to provide the positioning assistance data together with the MDT configuration. As yet another example, communication unit 1906 may be configured to forward the user data to a host computer or the wireless device.

Communication unit 1906 may transmit messages (e.g., to a wireless device and/or another network node). Communication unit 1906 may include a transmitter and/or a transceiver, such as RF transceiver circuitry 372 described above in relation to FIG. 5. Communication unit 1906 may include circuitry configured to transmit messages and/or signals (e.g., through wireless or wired means). In particular embodiments, communication unit 1906 may receive messages and/or signals for transmission from determining unit 1904 or any other unit of apparatus 1900. The functions of communication unit 1904 may, in certain embodiments, be performed in one or more distinct units.

The invention claimed is:

1. A method performed by a wireless device for configured Minimization of Drive Test, MDT, reporting, the method comprising:
obtaining a MDT configuration, wherein the obtained MDT configuration is for one or more of immediate MDT and logged MDT, the MDT configuration for performing one or more measurements associated with a specific reference signal type, beam level, or positioning assistance data, the obtained MDT configuration comprising three or more of:
a reportOnLeave configuration;
a reportQuantityRS-Indexes configuration;
a maxNrofRS-Indexes ToReport configuration;
an rsType configuration;
one or more A2 event specific configuration enhancements; and one or more periodic event specific configuration enhancements;

performing the one or more measurements according to the MDT configuration; and providing an MDT report based on the one or more measurements.

2. The method of claim 1, wherein obtaining the MDT configuration comprises receiving the MDT configuration from a radio access network, RAN, node.

3. The method of claim 2, wherein providing the MDT report comprises transmitting the MDT report to the RAN node.

4. The method of claim 1, wherein the obtained MDT configuration configures the wireless device to include, in the MDT report, at least one of:
location information as requested by Operations, Administration, and Maintenance (OAM);
beam level information;
a best beam index of at least one of a New Radio (NR) camped cell;
a best beam index of one or more neighboring NR cells;
at least one beam level measurement quantity of the NR camped cell; and
at least one beam level measurement quantity of one or more neighboring NR cells.

5. The method of claim 1, further comprising obtaining positioning assistance data from at least one of a RAN node and a location server.

6. The method of claim 5, wherein the positioning assistance data is obtained together with the MDT configuration.

7. The method of claim 5, further comprising:
retrieving positioning information based on the positioning assistance data; and
including the positioning information in the provided MDT report.

8. A method performed by a network node for configured Minimization of Drive Test, MDT, the method comprising:
determining a MDT configuration for a wireless device, wherein the MDT configuration is for one or more of immediate MDT and logged MDT, the MDT configuration for performing one or more measurements associated with a specific reference signal type, beam level, or positioning assistance data, the MDT configuration comprising three or more of the following:
a reportOnLeave configuration;
a reportQuantityRS-Indexes configuration;
a maxNrofRS-IndexesToReport configuration;
an rsType configuration;
one or more A2 event specific configuration enhancements; and
one or more periodic event specific configuration enhancements;
providing the MDT configuration to the wireless device; and
obtaining an MDT report from the wireless device.

9. The method of claim 8, wherein the network node is a radio access network (RAN) node.

10. The method of claim 8, wherein the MDT configuration is determined in cooperation with Operations, Administration, and Management (OAM), and the method further comprises providing the MDT report to OAM.

11. The method of claim 8, wherein the MDT configuration configures the wireless device to include, in the MDT report, at least one of:
location information as requested by Operations, Administration, and Maintenance (OAM);
beam level information;
a best beam index of at least one of a New Radio (NR) camped cell;
a best beam index of one or more neighboring NR cells;
at least one beam level measurement quantity of the NR camped cell; and
at least one beam level measurement quantity of one or more neighboring NR cells.

12. The method of claim 8, further comprising:
obtaining positioning assistance data from a location server; and
configuring the wireless device with the positioning assistance data.

13. The method of any one claim 12, wherein configuring the wireless device with the positioning assistance data comprises:
providing the positioning assistance data together with the MDT configuration.

14. The method of claim 12, further comprising:
obtaining positioning information from the wireless device, the positioning information based on the positioning assistance data.

15. The method of claim 14, wherein the positioning information is included in the obtained MDT report.

16. A wireless device for configured Minimization of Drive Test, MDT, reporting, the wireless device comprising:
processing circuitry configured to:
obtain a MDT configuration, wherein the obtained MDT configuration is for one or more of immediate MDT and logged MDT, the MDT configuration for performing one or more measurements associated with a specific reference signal type, beam level, or positioning assistance data, the obtained MDT configuration comprising three or more of the following:
a reportOnLeave configuration;
a reportQuantityRS-Indexes configuration;
a maxNrofRS-IndexesToReport configuration;
an rsType configuration;
one or more A2 event specific configuration enhancements; and
one or more periodic event specific configuration enhancements;
perform the one or more measurements according to the MDT configuration; and
provide an MDT report based on the one or more measurements.

17. The wireless device of claim 16, wherein the processing circuitry configured to obtain the MDT configuration comprises the processing circuitry configured to receive the MDT configuration from a radio access network, RAN, node.

18. A network node for configured Minimization of Drive Test, MDT, the network node comprising:
processing circuitry configured to:
determine a MDT configuration for a wireless device wherein the MDT configuration is for one or more of immediate MDT and logged MDT, the MDT configuration for performing one or more measurements associated with a specific reference signal type, beam level, or positioning assistance data, the MDT configuration comprising three or more of the following:
a reportOnLeave configuration;
a reportQuantityRS-Indexes configuration;
a maxNrofRS-IndexesToReport configuration;
an rsType configuration;
one or more A2 event specific configuration enhancements; and one or more periodic event specific configuration enhancements;

provide the MDT configuration to the wireless device; and obtain an MDT report from the wireless device.

* * * * *